(12) United States Patent  (10) Patent No.: US 9,041,651 B2
Yasutake  (45) Date of Patent: May 26, 2015

(54) MULTI-TOUCH MOUSE

(71) Applicant: Primax Electronics Ltd., Neihu, Taipei (TW)

(72) Inventor: Taizo Yasutake, Cupertino, CA (US)

(73) Assignee: PRIMAX ELECTRONICS LTD., Neihu (TW)

( * ) Notice: Subject to any disclaimer, the term of this patent is extended or adjusted under 35 U.S.C. 154(b) by 240 days.

(21) Appl. No.: 13/676,886

(22) Filed: Nov. 14, 2012

(65) Prior Publication Data

US 2013/0127719 A1    May 23, 2013

Related U.S. Application Data

(60) Provisional application No. 61/561,359, filed on Nov. 18, 2011.

(51) Int. Cl.
*G09G 5/08* (2006.01)
*G06F 3/033* (2013.01)
*G06F 3/038* (2013.01)
*G06F 3/0354* (2013.01)

(52) U.S. Cl.
CPC ............... *G06F 3/033* (2013.01); *G06F 3/038* (2013.01); *G06F 3/03543* (2013.01); *G06F 3/03547* (2013.01)

(58) Field of Classification Search
None
See application file for complete search history.

(56) References Cited

U.S. PATENT DOCUMENTS

| | | | |
|---|---|---|---|
| 8,279,176 B2* | 10/2012 | Krah et al. | 345/163 |
| 2001/0033268 A1* | 10/2001 | Jiang | 345/163 |
| 2010/0117963 A1* | 5/2010 | Westerman et al. | 345/163 |
| 2010/0245246 A1* | 9/2010 | Rosenfeld et al. | 345/163 |
| 2011/0109552 A1* | 5/2011 | Yasutake | 345/163 |
| 2011/0227947 A1* | 9/2011 | Benko et al. | 345/650 |
| 2012/0131514 A1* | 5/2012 | Ansell et al. | 715/863 |
| 2013/0120261 A1* | 5/2013 | Piot et al. | 345/163 |

* cited by examiner

*Primary Examiner* — Adam R Giesy
*Assistant Examiner* — Henok Heyi
(74) *Attorney, Agent, or Firm* — Kirton McConkie; Evan R. Witt

(57) ABSTRACT

A multi-touch mouse includes a mouse body, a touch pad, and a controlling unit. In a case that the touch pad is not touched and the touch state is OFF, the multi-touch mouse is in a conventional two-dimensional mouse mode. In a case that the touch state of the touch pad is ON in response to a touch action and the mouse body is moved, the controlling unit switches the control mode of the multi-touch mouse to a touch gesture control mode and generates a touch gesture command.

22 Claims, 18 Drawing Sheets

MULTI-TOUCH MOUSE

CROSS-REFERENCE TO RELATED APPLICATION

This application claims the benefit of U.S. Provisional Patent Application No. 61/561,359 entitled "Multi-touch mouse without multi-touch sensor" filed Nov. 18, 2011, the contents of which are incorporated herein by reference.

FIELD OF THE INVENTION

The present invention relates to a mouse, and more particularly to a multi-touch mouse that uses a multi-touch technology.

BACKGROUND OF THE INVENTION

Recently, the development of a multi-touch sensor can provide highly extensive input capabilities, including the multi-dimensional input commands for computer graphics. In comparison with the standard input devices such as the keyboard and the conventional two-dimensional mouse, the input features of the multi-touch sensor based on the intuitive and user-friendly multi-finger gesture dramatically improve productivity of 2D/3D related works. However, most end users of the personal computer in a business market usually work with a desktop computer and the two-dimensional mouse. Even if the operating system of the personal computer provides a touch-centric user interface to the desktop computer, this human-computer interface does not provide the end users with comfortable human-computer interaction related to touch inputs.

Therefore, there is a need of providing an improved multi-touch mouse that provides intuitive and ergonomic input capabilities to generate multi-touch equivalent input functions as well as conventional two-dimensional mouse function.

SUMMARY OF THE INVENTION

The present invention provides a multi-touch mouse without a multi-touch sensor. The multi-touch mouse comprises plural touch pads. The plural touch pads are installed on a mouse body of the multi-touch mouse. Consequently, the multi-touch mouse can provide a novel user interface for the conventional two-dimensional application as well as the three-dimensional computer graphics applications.

The multi-touch mouse of the present invention is capable of generating multi-touch input commands for any application software that recognize multi-touch messages defined by the operating system of the computer. The present invention also discloses the intelligent functions in a controlling unit of the multi-touch mouse. The controlling unit can execute smart management of multiple control modes among a conventional two-dimensional mouse mode, a single-touch gesture control mode and a multi-touch gesture control mode.

The functions for generating the multi-touch input commands are implemented collaboratively by the controlling unit of the multi-touch mouse and the support program of the computer host that communicates with the controlling unit.

In accordance with an aspect of the present invention, there is provided a multi-touch mouse. The multi-touch mouse is in communication with a computer system. The multi-touch mouse includes a mouse body, a first touch pad, an optical sensor, and a controlling unit. The first touch pad is disposed on a top surface of the mouse body. A touch state of the first touch pad is changed to an ON state when the first touch pad is touched. If the first touch pad is in the ON state, a control mode of the multi-touch mouse is switched from a conventional two-dimensional mouse mode to a touch gesture control mode. The optical sensor is disposed within the mouse body for tracking a motion of the mouse body. The controlling unit is connected with the first touch pad and the optical sensor for detecting the touch state of the first touch pad and receiving a result of tracking the motion of the mouse body. If the first touch pad is in the ON state and the result of tracking the motion of the mouse body is received by the controlling unit, the controlling unit switches the control mode of the multi-touch mouse to the touch gesture control mode and issues a one-finger touch gesture command to the computer system, so that the computer system executes a one-finger touch gesture function corresponding to the one-finger touch gesture command.

In an embodiment, the computer system includes a computer host and a display screen. The computer host is in communication with the multi-touch mouse for receiving the one-finger touch gesture command from the multi-touch mouse, thereby executing the one-finger touch gesture function. The display screen is connected with the computer host. If the multi-touch mouse is in the conventional two-dimensional mouse mode, a cursor icon is shown on the display screen. If the multi-touch mouse is in the touch gesture control mode, a one-finger touch gesture icon is shown on the display screen.

In an embodiment, the first touch pad is a four-way directional digital switch or a digital toggle switch.

In an embodiment, the first touch pad includes a middle touch region, a top touch region, a left touch region, a bottom touch region, and a right touch region. A touch state of the middle touch region is changed to the ON state when the middle touch region is touched. The top touch region is located at a top side of the middle touch region. A touch state of the top touch region is changed to the ON state when the top touch region is touched. The left touch region is located at a left side of the middle touch region. A touch state of the left touch region is changed to the ON state when the left touch region is touched. The bottom touch region is located at a bottom side of the middle touch region. A touch state of the bottom touch region is changed to the ON state when the bottom touch region is touched. The right touch region is located at a right side of the middle touch region. A touch state of the right touch region is changed to the ON state when the right touch region is touched.

In an embodiment, the multi-touch mouse further includes a second touch pad and a third touch pad. The second touch pad is located at a first side of the mouse body. A touch state of the second touch pad is changed to the ON state when the second touch pad is touched. The third touch pad is located at a second side of the mouse body. A touch state of the third touch pad is changed to the ON state when the third touch pad is touched. If the first touch pad and the second touch pad are both in the ON states and the result of tracking the motion of the mouse body is received by the controlling unit, the controlling unit switches the control mode of the multi-touch mouse to the touch gesture control mode and issues a two-finger touch gesture command to the computer system, so that the computer system executes a two-finger touch gesture function corresponding to the two-finger touch gesture command. If the first touch pad, the second touch pad and the third touch pad are all in the ON states and the result of tracking the motion of the mouse body is received by the controlling unit, the controlling unit switches the control mode of the multi-touch mouse to the touch gesture control mode and issues a three-finger touch gesture command to the computer system, so that the computer system executes a three-finger touch gesture function corresponding to the three-finger touch gesture command.

In an embodiment, the computer system includes a computer host and a display screen. The computer host is in communication with the multi-touch mouse for receiving the two-finger touch gesture command or the three-finger touch gesture command from the multi-touch mouse, thereby executing the two-finger touch gesture function or the three-finger touch gesture command. The display screen is connected with the computer host. If the multi-touch mouse is in the conventional two-dimensional mouse mode, a cursor icon is shown on the display screen. If the multi-touch mouse is in the touch gesture control mode, a two-finger touch gesture icon or a three-finger touch gesture icon is shown on the display screen.

In an embodiment, the first touch pad includes an inner touch region and an outer touch region. A touch state of the inner touch region is changed to the ON state when the inner touch region is touched. If the inner touch region is in the ON state, the controlling unit switches the control mode of the multi-touch mouse to the touch gesture control mode and issues the one-finger touch gesture command to the computer system. The outer touch region is disposed around the inner touch region. A touch state of the outer touch region is changed to the ON state when the outer touch region is touched. If the outer touch region and the second touch pad or the third touch pad are both in the ON states, the controlling unit switches the control mode of the multi-touch mouse to the touch gesture control mode and issues the two-finger touch gesture command to the computer system. If the outer touch region, the second touch pad and the third touch pad are all in the ON states, the controlling unit switches the control mode of the multi-touch mouse to the touch gesture control mode and issues the three-finger touch gesture command to the computer system.

In an embodiment, after the first touch pad and the second touch pad or the third touch pad are both touched to be in the ON states, the controlling unit judges whether a time period of maintaining the ON states of the first touch pad and the second touch pad or the third touch pad is longer than a predetermined time threshold or not. If the time period of maintaining the ON states of the first touch pad and the second touch pad or the third touch pad is longer than the predetermined time threshold, the controlling unit switches the control mode of the multi-touch mouse to the touch gesture control mode and generates a graphic object manipulation command. If the time period of maintaining the ON states of the first touch pad and the second touch pad or the third touch pad is not longer than the predetermined time threshold, the controlling unit switches the control mode of the multi-touch mouse to the touch gesture control mode and generates the two-finger touch gesture command.

In an embodiment, after the graphic object manipulation command is received by a computer host of the computer system, a cursor icon shown on a display screen of the computer system is converted into a first finger touch gesture icon and a second finger touch gesture icon by the computer host, and a graphic object manipulation function corresponding to the graphic object manipulation command is executed by the computer host.

In an embodiment, in response to a tap action on the first touch pad and a touch action on the second touch pad or the third touch pad, the touch states of the first touch pad and second touch pad or the third touch pad are changed to the ON states, and the controlling unit switches the control mode of the multi-touch mouse to the touch gesture control mode and generates a graphic object manipulation command, wherein a force of applying the tap action on the first touch pad is larger than a force of applying the touch action on the second touch pad or the third touch pad.

In an embodiment, after the graphic object manipulation command is received by a computer host of the computer system, a cursor icon shown on a display screen of the computer system is converted into a first finger touch gesture icon and a second finger touch gesture icon by the computer host, and a graphic object manipulation function corresponding to the graphic object manipulation command is executed by the computer host.

In an embodiment, the multi-touch mouse further includes a fourth touch pad. The fourth touch pad is located at the first side of the mouse body and located near the second touch pad. A touch state of the fourth touch pad is changed to the ON state when the fourth touch pad is touched. If the fourth touch pad is in the ON state, the controlling unit switches the control mode of the multi-touch mouse to the touch gesture control mode and generates a graphic object manipulation command.

In an embodiment, after the graphic object manipulation command is received by a computer host of the computer system, a cursor icon shown on a display screen of the computer system is converted into a first finger touch gesture icon and a second finger touch gesture icon by the computer host, and a graphic object manipulation function corresponding to the graphic object manipulation command is executed by the computer host.

In an embodiment, if the control mode of the multi-touch mouse is in the conventional two-dimensional mouse mode, a tracking sensitivity of the optical sensor has a first default tracking sensitivity value. If the control mode of the multi-touch mouse is switched from the conventional two-dimensional mouse mode to the touch gesture control mode, the tracking sensitivity of the optical sensor is changed from the first default tracking sensitivity value to a second default tracking sensitivity value. The second default tracking sensitivity value is larger than the first default tracking sensitivity value.

In an embodiment, after the control mode of the multi-touch mouse is in the touch gesture control mode, if a time period of maintaining the ON state of the first touch region is not longer than a predetermined time threshold, the controlling unit switches the control mode of the multi-touch mouse to the conventional two-dimensional mouse mode.

In accordance with another aspect of the present invention, there is provided a multi-touch mouse. The multi-touch mouse is in communication with a computer system. The multi-touch mouse includes a mouse body, a first touch pad, and a controlling unit. The first touch pad is disposed on a top surface of the mouse body, and includes an inner touch region and an outer touch region. A touch state of the inner touch region is changed to an ON state when the inner touch region is touched. If the inner touch region is in the ON state, a control mode of the multi-touch mouse is switched from a conventional two-dimensional mouse mode to a touch gesture control mode. The outer touch region is located near the inner touch region. A touch state of the outer touch region is changed to the ON state when the outer touch region is touched. The controlling unit is connected with the first touch pad for detecting the touch states of the inner touch region and the outer touch region. If the inner touch region and the outer touch region are both in the ON states, the controlling unit switches the control mode of the multi-touch mouse to the touch gesture control mode and issues a two-finger touch gesture command to the computer system, so that the computer system executes a two-finger touch gesture function corresponding to the two-finger touch gesture command.

In an embodiment, the computer system includes a computer host and a display screen. The computer host is in communication with the multi-touch mouse for receiving the two-finger touch gesture command from the multi-touch mouse, thereby executing the two-finger touch gesture function. The display screen is connected with the computer host. If the multi-touch mouse is in the conventional two-dimensional mouse mode, a cursor icon is shown on the display screen. If the multi-touch mouse is in the touch gesture control mode, a two-finger touch gesture icon is shown on the display screen.

In an embodiment, the multi-touch mouse further includes a second touch pad, which is located at a first side of the mouse body. A touch state of the second touch pad is changed to the ON state when the second touch pad is touched. If the second touch pad is in the ON state and the first touch pad is continuously in the ON state, the controlling unit switches the control mode of the multi-touch mouse to the touch gesture control mode and issues a graphic object manipulation command to the computer system, so that the computer system executes a graphic object manipulation function corresponding to the graphic object manipulation command.

In an embodiment, after the graphic object manipulation command is received by a computer host of the computer system, a cursor icon shown on a display screen of the computer system is converted into a first finger touch gesture icon and a second finger touch gesture icon by the computer host, and the graphic object manipulation function corresponding to the graphic object manipulation command is executed by the computer host.

In an embodiment, the multi-touch mouse further includes a second touch pad and a fourth touch pad. The second touch pad is located at a first side of the mouse body. A touch state of the second touch pad is changed to the ON state when the second touch pad is touched. The fourth touch pad is located at the first side of the mouse body and located near the second touch pad. A touch state of the fourth touch pad is changed to the ON state when the fourth touch pad is touched. If the fourth touch pad is in the ON state, the controlling unit switches the control mode of the multi-touch mouse to the touch gesture control mode and generates a graphic object manipulation command.

In an embodiment, after the graphic object manipulation command is received by a computer host of the computer system, a cursor icon shown on a display screen of the computer system is converted into a first finger touch gesture icon and a second finger touch gesture icon by the computer host, and a graphic object manipulation function corresponding to the graphic object manipulation command is executed by the computer host.

In an embodiment, the outer touch region includes a first outer touch part and a second outer touch part. The first outer touch part is located at a first side of the inner touch region. A touch state of the first outer touch part is changed to the ON state when the first outer touch part is touched. If the first outer touch part is in the ON state, the controlling unit issues a first button command to the computer system, so that the computer system executes a first button function corresponding to the first button command. The second outer touch part is located at a second side of the inner touch region. A touch state of the second outer touch part is changed to the ON state when the second outer touch part is touched. If the second outer touch part is in the ON state, the controlling unit issues a second button command to the computer system, so that the computer system executes a second button function corresponding to the second button command.

In an embodiment, if the control mode of the multi-touch mouse is in the conventional two-dimensional mouse mode, a tracking sensitivity of the optical sensor has a first default tracking sensitivity value. If the control mode of the multi-touch mouse is switched from the conventional two-dimensional mouse mode to the touch gesture control mode, the tracking sensitivity of the optical sensor is changed from the first default tracking sensitivity value to a second default tracking sensitivity value. The second default tracking sensitivity value is larger than the first default tracking sensitivity value.

In an embodiment, after the control mode of the multi-touch mouse is in the touch gesture control mode, if a time period of maintaining the ON state of the inner touch region is not longer than a predetermined time threshold, the controlling unit switches the control mode of the multi-touch mouse to the conventional two-dimensional mouse mode.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The presently preferred embodiments of the present invention can be understood by reference to the drawings, wherein like reference numbers indicate identical or functionally similar elements. It will be readily understood that the components of the present invention, as generally described and illustrated in the figures herein, could be arranged and designed in a wide variety of different configurations. Thus, the following more detailed description, as represented in the figures, is not intended to limit the scope of the invention as claimed, but is merely representative of presently preferred embodiments of the invention.

The following disclosure of the present invention may be grouped into subheadings. The utilization of the subheadings is for convenience of the reader only and is not to be construed as limiting in any sense.

Various operations may be described as multiple discrete operations in turn, in a manner that may be helpful in understanding embodiments of the present invention; however, the order of description should not be construed to imply that these operations are order dependent.

The description may use the phrases "in an embodiment", or "in various embodiments", which may each refer to one or more of the same or different embodiments. Furthermore, the terms "comprising", "including", "having", and the like, as used with respect to embodiments of the present invention, are synonymous with the definition afforded the term "comprising".

Figure 1:
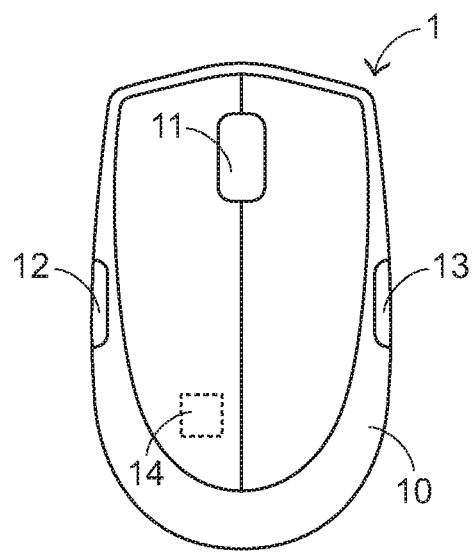
FIG. 1 is a schematic top view illustrating three touch pads of a multi-touch mouse according to a first embodiment of the present invention.
Figure 2:
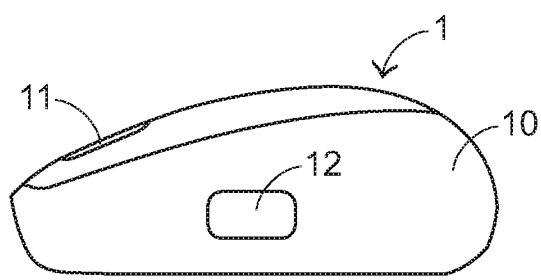
FIG. 2 is a schematic side view illustrating the multi-touch mouse according to the first embodiment of the present invention.
Figure 3:
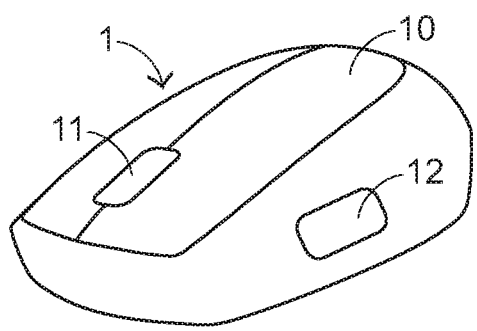
FIG. 3 is a schematic perspective view illustrating the multi-touch mouse according to the first embodiment of the present invention.

1. Hardware Structure of Multi-Touch Mouse without Multi-Touch Sensor Pad And its Multi-Touch Gesture Generation 1-1 Basic Hardware Structure Please refer to FIGS. 1, 2 and 3. FIG. 1 is a schematic top view illustrating three touch pads of a multi-touch mouse according to a first embodiment of the present invention. FIG. 2 is a schematic side view illustrating the multi-touch mouse according to the first embodiment of the present invention. FIG. 3 is a schematic perspective view illustrating the multi-touch mouse according to the first embodiment of the present invention. The multi-touch mouse 1 comprises a first touch pad 11, a second touch pad 12, and a third touch pad 13. The first touch pad 11 is disposed on a top surface of a mouse body 10. The second touch pad 12 is located at a first side of the mouse body 10. The third touch pad 13 is located at a second side of the mouse body 10. Each of the touch pads 11, 12 and 13 may report its touch state. In a case that the touch pad 11, 12 or 13 is touched, the touch state is an ON state. In a case that he touch pad 11, 12 or 13 is not touched, the touch state is an OFF state. In this embodiment, the first side of the mouse body 10 is a left side of the mouse body 10, and the second side of the mouse body 10 is a right side of the mouse body 10.

The multi-touch mouse 1 further comprises a controlling unit 14. The controlling unit 14 may be designed to provide two control modes of the multi-touch mouse 1. The first control mode of the multi-touch mouse 1 is a conventional two-dimensional mouse mode. In the first control mode, the multi-touch mouse 1 functions as a conventional two-dimensional mouse. The second control mode of the multi-touch mouse 1 is a touch gesture control mode. In the second control mode, the multi-touch mouse 1 functions as a multi-touch digitizer. By means of the controlling unit 14, the multi-touch mouse 1 has dual functions of two independent input devices (i.e. the conventional two-dimensional mouse and the multi-touch digitizer) even if the physical structure of the multi-touch mouse 1 is similar to that of the conventional mouse. In this embodiment, the controlling unit 14 is a firewall component installed in the multi-touch mouse 1.

On the other hand, the multi-touch mouse 1 further comprises an optical sensor for tracking a mouse position change. The optical sensor may provide plural tracking sensitivities. Generally, the tracking sensitivity is measured in terms of counts per inch (CPI). For example, the controlling unit 14 may set a first default tracking sensitivity value (e.g. 800 CPI) for the conventional two-dimensional mouse. In a case that the control mode of the multi-touch mouse 1 is switched from the conventional two-dimensional mouse mode to the touch gesture control mode, the controlling unit 14 may change the first default tracking sensitivity value to a second default tracking sensitivity tracking sensitivity value (e.g. 3000 CPI).

Figure 4A:
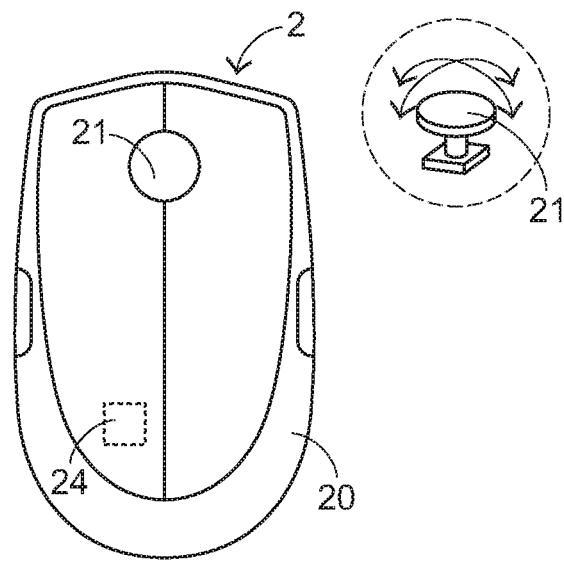
FIG. 4A is a schematic top view illustrating a first touch pad of a multi-touch mouse according to a second embodiment of the present invention.

Hereinafter, some alternate hardware designs of the first touch pad will be illustrated with reference to FIGS. 4A, 4B and 4C. FIG. 4A is a schematic top view illustrating a first touch pad of a multi-touch mouse according to a second embodiment of the present invention. As shown in FIG. 4A, the first touch pad 21 of the multi-touch mouse 2 is located at a first end of the top surface of the mouse body 20. Moreover, the first touch pad 21 is a four-way directional digital switch. This hardware design can provide an additional input freedom such as the continuation of one-finger touch gesture. For example, in a case that a first finger (not shown) of a user is placed on the first touch pad 21 and the first finger pushes the four-way directional digital switch 21, the four-way directional digital switch 21 generates an ON signal corresponding to one of four directional data packets. According to the continuation of one-finger touch gesture (i.e. the continuation of the first finger touch gesture), the controlling unit 24 executes a corresponding continuation command.

Figure 4B:
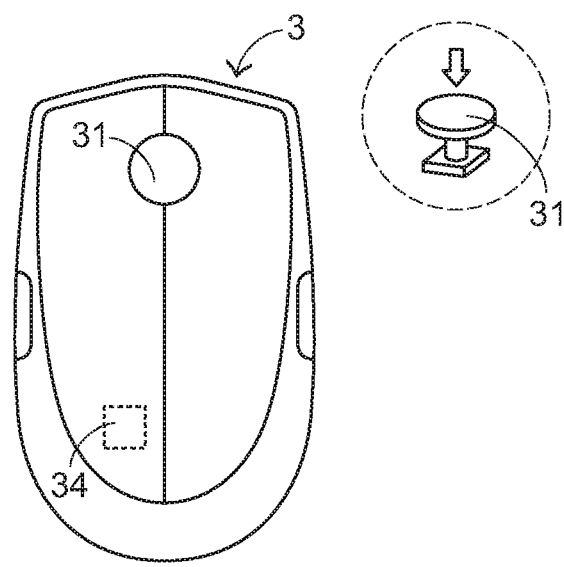
FIG. 4B is a schematic top view illustrating a first touch pad of a multi-touch mouse according to a third embodiment of the present invention.

FIG. 4B is a schematic top view illustrating a first touch pad of a multi-touch mouse according to a third embodiment of the present invention. The structure of the multi-touch mouse of FIG. 4B is a simplified version of the multi-touch mouse of FIG. 4A. As shown in FIG. 4B, the first touch pad 31 of the multi-touch mouse 3 is a digital toggle switch. By pushing down the first touch pad 31, the digital toggle switch 31 generates an ON signal or an OFF signal, which is then reported to the controlling unit 34. In response to the ON signal or the OFF signal, the controlling unit 34 executes a corresponding user programmable command.

Figure 4C:
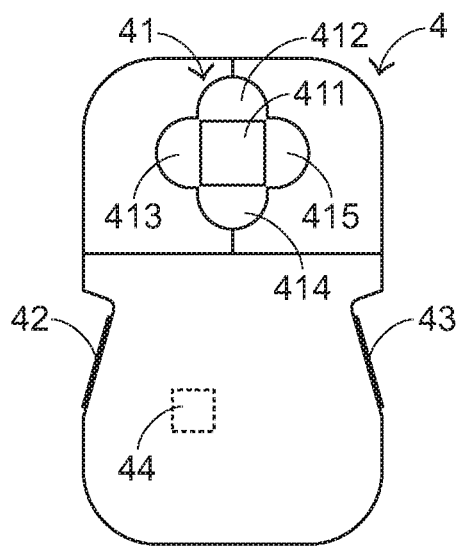
FIG. 4C is a schematic top view illustrating a first touch pad of a multi-touch mouse according to a fourth embodiment of the present invention.

FIG. 4C is a schematic top view illustrating a first touch pad of a multi-touch mouse according to a fourth embodiment of the present invention. As shown in FIG. 4C, the first touch pad 41 of the multi-touch mouse 4 is a four-leaf clover shaped digital switch. The first touch pad 41 comprises five independent touch regions, including a middle touch region 411, a top touch region 412, a left touch region 413, a bottom touch region 414 and a right touch region 415. The touch regions 411~415 may report respective signals to the controlling unit 44. In other words, the four-leaf clover shaped digital switch 41 may generate five data packets. Each of the five data packets contains a touch state of a corresponding one of the five touch regions 411~415.

1-2 Multi-touch command operation

Figure 5A:
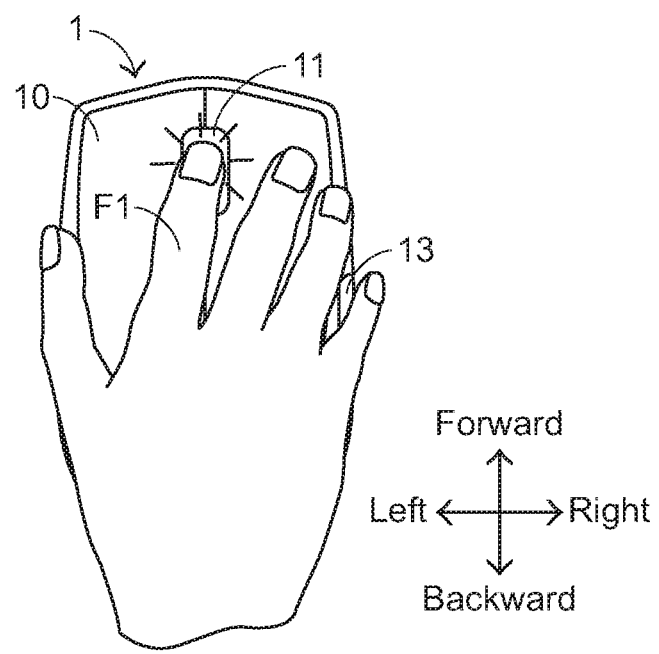
FIGS. 5A~5C are schematic top views illustrating the operations of the multi-touch mouse according to the first embodiment of the present invention, in which one, two and three fingers are respectively placed on corresponding touch pads of the mouse body.
Figure 5B:
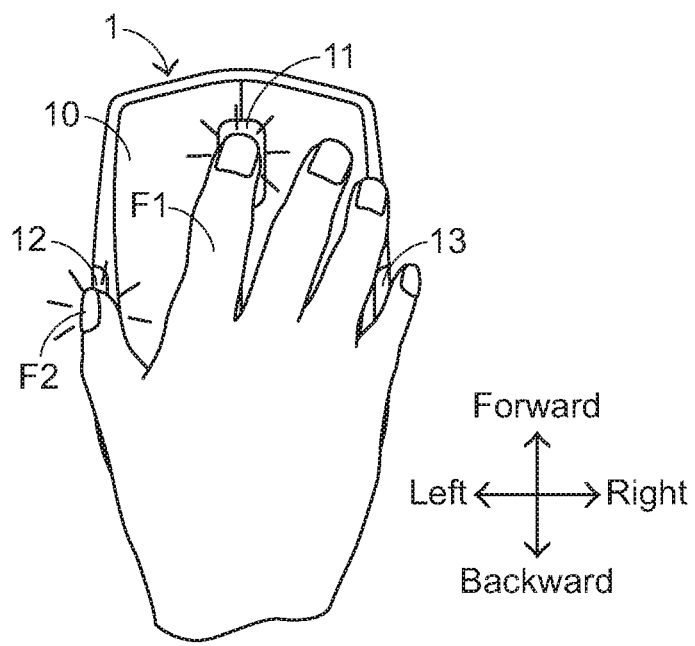
Figure 5C:
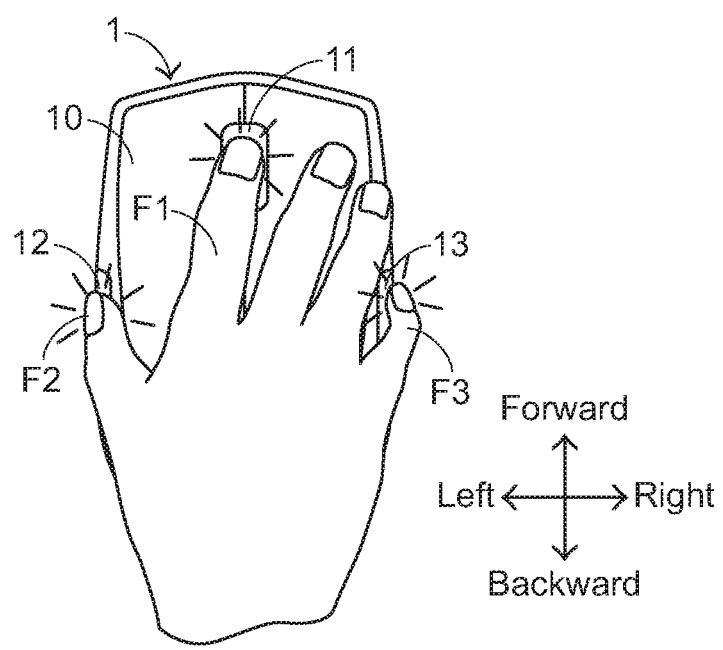

FIGS. 5A-5C are schematic top views illustrating the operations of the multi-touch mouse according to the first embodiment of the present invention, in which one, two and three fingers are respectively placed on corresponding touch pads of the mouse body. In a case that the first touch pad 11 on the top surface of the mouse body 10 is not touched, the multi-touch mouse is operated in the conventional two-dimensional mouse mode. In a case that the first touch pad 11 is touched by the user (see FIG. 5A), the controlling unit 14 detects that the touch state of the first touch pad 11 is changed from the OFF state to the ON state. As the touch state of the first touch pad 11 is changed, the control mode of the multi-touch mouse 1 is switched from the conventional two-dimensional mouse mode to the touch gesture control mode. In a case that the mouse body 10 is moved by the user and the first touch pad 11 is continuously touched by a first finger F1, the controlling unit 14 generates an emulated one-finger touch gesture command corresponding to the moving trajectory of the mouse body 10. For example, the moving trajectory of the mouse body 10 is a right-left direction, a forward-backward direction, and so on. When the controlling unit 14 generates the emulated one-finger touch gesture command according to the above operations, the control mode of the multi-touch mouse is defined as a one-finger touch gesture control mode of the touch gesture control mode.

In a case that the first touch pad 11 is touched by the first finger F1 and the second touch pad 12 at the left side of the mouse body 10 is touched by a second finger F2 (see FIG. 5B), the controlling unit 14 detects that the touch states of the first touch pad 11 and the second touch pad 12 are changed from the OFF states to the ON states. As the touch states of the first touch pad 11 and the second touch pad 12 are changed, the control mode of the multi-touch mouse 1 is switched from the conventional two-dimensional mouse mode to the touch gesture control mode. When the mouse body 10 is moved by the user and the first touch pad 11 and the second touch pad 12 are continuously touched, the controlling unit 14 generates an emulated two-finger touch gesture command corresponding to the moving trajectory of the mouse body 10. For example, the moving trajectory of the mouse body 10 is a right-left direction, a forward-backward direction, and so on. When the controlling unit 14 generates the emulated two-finger touch gesture command according to the above operations, the control mode of the multi-touch mouse is defined as a two-finger touch gesture control mode of the touch gesture control mode.

In a case that the first touch pad 11 is touched by the first finger F1, the second touch pad 12 is touched by the second finger F2 and the third touch pad 13 at the right side of the mouse body 10 is touched by a third finger F3 (see FIG. 5C), the controlling unit 14 detects that the touch states of the first touch pad 11, the second touch pad 12 and the third touch pad 13 are changed from the OFF states to the ON states. As the touch states of the first touch pad 11, the second touch pad 12 and the third touch pad 13 are changed, the control mode of the multi-touch mouse 1 is switched from the conventional two-dimensional mouse mode to the touch gesture control mode. In a case that the mouse body 10 is moved by the user and the first touch pad 11, the second touch pad 12 and the third touch pad 13 are continuously touched, the controlling unit 14 generates an emulated three-finger touch gesture command corresponding to the moving trajectory of the mouse body 10. For example, the moving trajectory of the mouse body 10 is a right-left direction, a forward-backward direction, and so on. When the controlling unit 14 generates the emulated three-finger touch gesture command according to the above operations, the control mode of the multi-touch mouse is defined as a three-finger touch gesture control mode of the touch gesture control mode.

Figure 5D:
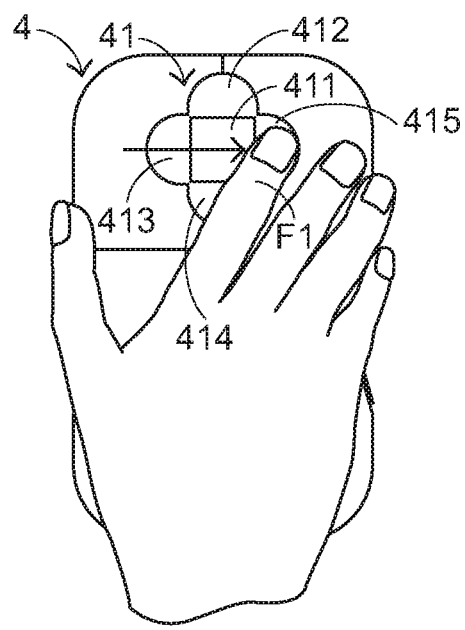
FIGS. 5D and 5E are schematic top views illustrating the operations of the multi-touch mouse according to the fourth embodiment of the present invention, in which a scroll command is generated in response to a one-finger touch gesture.
Figure 5E:
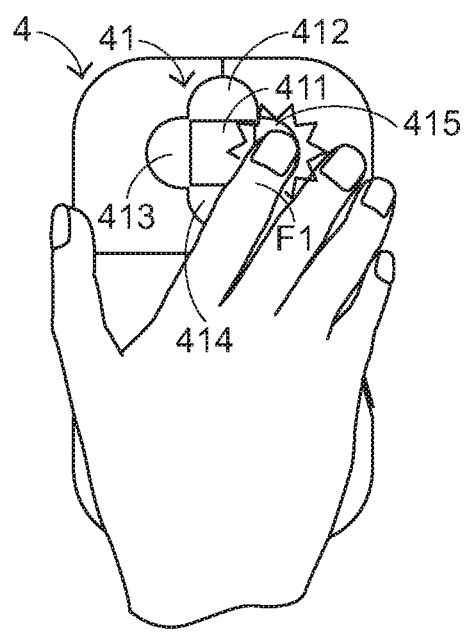

Please refer to FIGS. 5D and 5E. FIGS. 5D and 5E are schematic top views illustrating the operations of the multi-touch mouse according to the fourth embodiment of the present invention, in which a scroll command is generated in response to a one-finger touch gesture. As shown in FIG. 5D, the first finger F1 of the user is moved from the left touch region 413 to the right touch region 415. The trajectory of sequentially touching the left touch region 413, the middle touch region 411 and the right touch region 415 by the first finger F1 may be considered as a continuous touch action. The continuous touch action denotes the continuation of a scroll action. When the above continuous touch action is detected by the controlling unit 44, a corresponding continuous scroll command is generated.

In a case that a strong touch action (e.g. a tap action) is suddenly given to one of the touch regions 411~415 of the four-leaf clover shaped digital switch 41 (see FIG. 5E), this touch action is considered as an input command of a forward/backward action and the input command is stored in the controlling unit 44. Alternatively, in some other embodiments, this touch action is considered as an input command corresponding to a specified function and the input command is stored in the controlling unit 44. The embodiments associated with the tap action will be illustrated later.

Figure 6A:
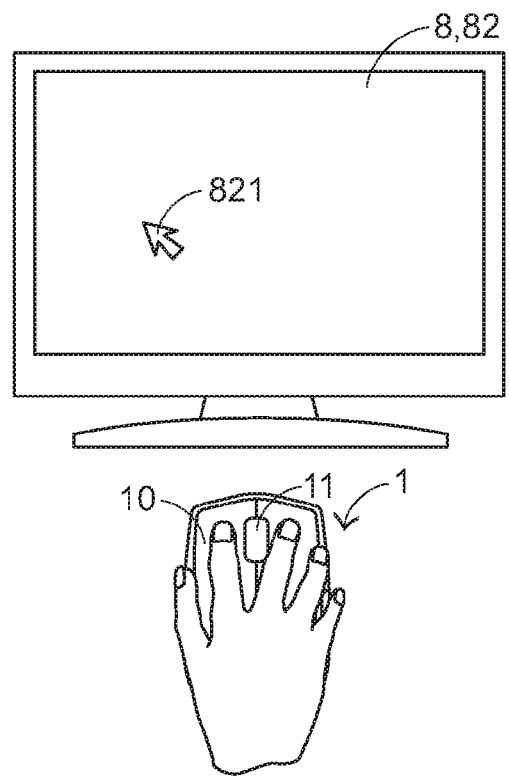
FIGS. 6A~6C schematically illustrate the visual feedback of a computer system by operating the multi-touch mouse according to the first embodiment of the present invention in the one-finger touch gesture control mode.
Figure 6B:
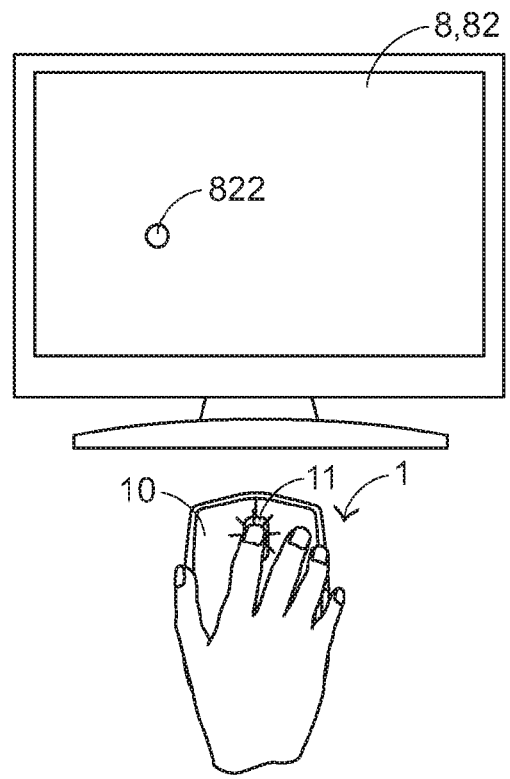
Figure 6C:
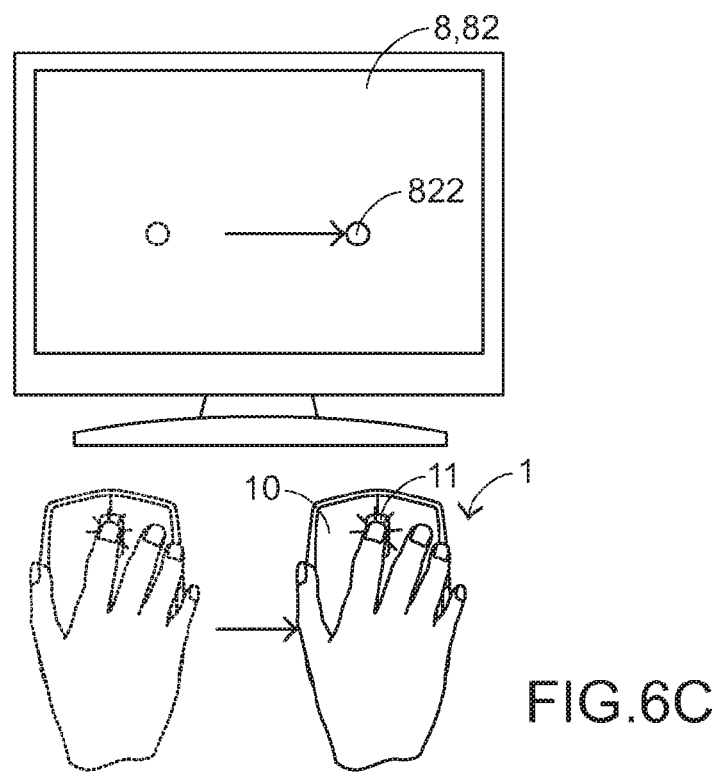

FIGS. 6A~6C schematically illustrate the visual feedback of a computer system by operating the multi-touch mouse according to the first embodiment of the present invention in the one-finger touch gesture control mode. As shown in FIGS. 6A~6C, the multi-touch mouse 1 is in communication with a computer system 8 (see also FIG. 11). The visual feedback corresponding to the operation of the multi-touch mouse 1 is shown on a display screen 82 of the computer system 8.

Firstly, as shown in FIG. 6A, the first touch pad 11 of the multi-touch mouse 1 is not touched, and thus the multi-touch mouse 1 is operated in the conventional two-dimensional mouse mode. In the conventional two-dimensional mouse mode, a support program 8111 (see FIG. 11) of the computer system 8 is executed to display a conventional cursor icon 821 (e.g. an arrow icon) on the display screen 82 and indicate the current position of the current cursor icon 821.

Then, as shown in FIG. 6B, the user touches the first touch pad 11 of the multi-touch mouse 1 in order to initiate the one-finger touch gesture command. Under this circumstance, the controlling unit 14 detects that the touch state of the first touch pad 11 is changed from the OFF state to the ON state. As the touch state of the first touch pad 11 is changed, the control mode of the multi-touch mouse 1 is changed from the conventional two-dimensional mouse mode to the touch gesture control mode. At the same time, the controlling unit 14 issues a switching notification message M (see FIG. 11) to the support program 8111 of the computer system 8. The switching notification message M indicates that the control mode of the multi-touch mouse 1 is switched to the touch gesture control mode. After the switching notification message M corresponding to the touch gesture control mode is received by the support program 8111 of the computer system 8, the support program 8111 is executed to display a one-finger touch gesture icon 822 (e.g. a one-circle icon) corresponding to the one-finger touch gesture on the display screen 82.

As shown in FIG. 6C, the one-finger touch gesture command is executed, and the corresponding visual feedback is shown on the display screen 82. In a case that the mouse body 10 is moved in the right direction and the first touch pad 11 is continuously touched, the one-finger touch gesture icon 822 (i.e. the one-circle icon) is correspondingly moved with the mouse body 10. That is, the one-finger touch gesture icon 822 shown on the display screen 82 is moved in the right direction.

Figure 7A:
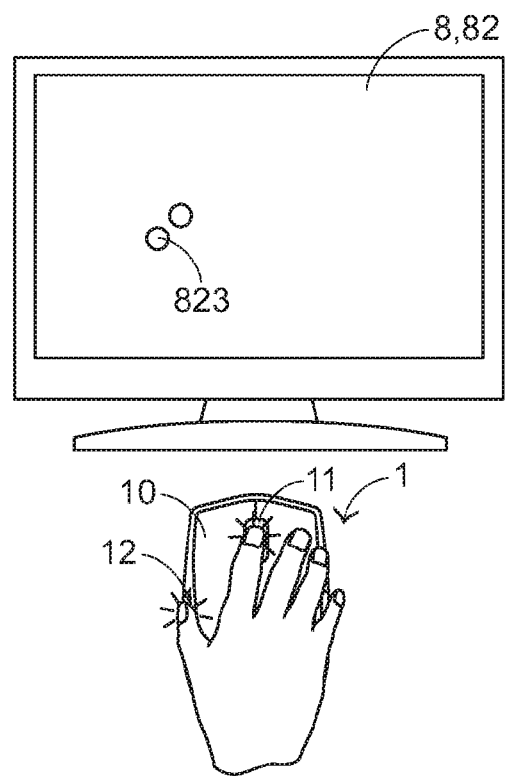
FIGS. 7A~7B schematically illustrate the visual feedback of a computer system by operating the multi-touch mouse according to the first embodiment of the present invention in the two-finger touch gesture control mode.
Figure 7B:
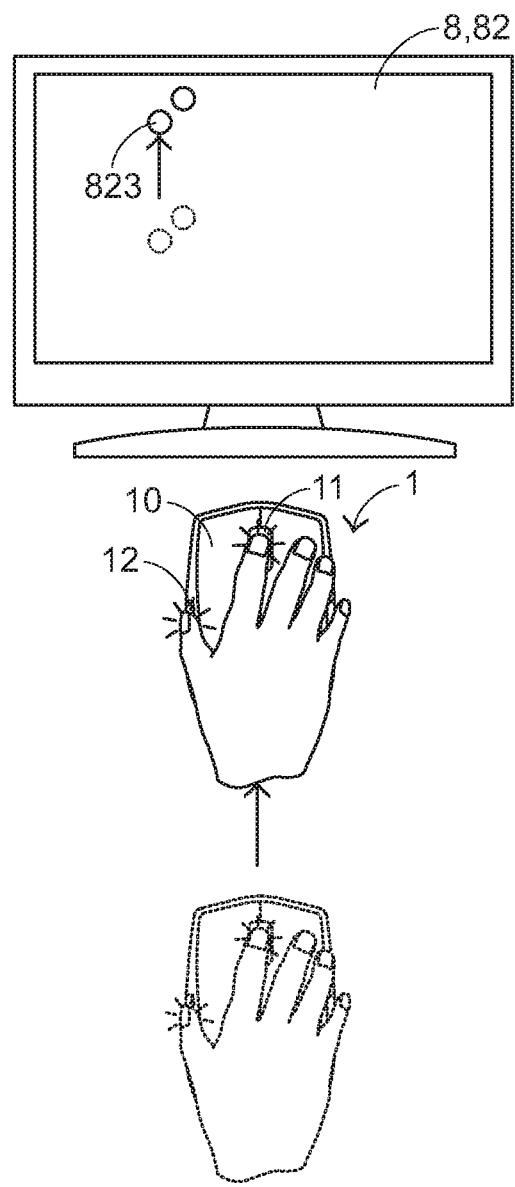

FIGS. 7A~7B schematically illustrate the visual feedback of a computer system by operating the multi-touch mouse according to the first embodiment of the present invention in the two-finger touch gesture control mode.

As shown in FIG. 7A, the user touches the first touch pad 11 and the second touch pad 12 of the multi-touch mouse 1 in order to initiate the two-finger touch gesture command. Under this circumstance, the controlling unit 14 detects that the touch states of the first touch pad 11 and the second touch pad 12 are changed from the OFF states to the ON states. As the touch states of the first touch pad 11 and the second touch pad 12 are changed, the control mode of the multi-touch mouse 1 is switched from the conventional two-dimensional mouse mode to the touch gesture control mode. At the same time, the controlling unit 14 issues a switching notification message M to the support program 8111 of the computer system 8. After the switching notification message M corresponding to the touch gesture control mode is received by the support program 8111 of the computer system 8, the support program 8111 is executed to display a two-finger touch gesture icon 823 (e.g. a two-circle icon) corresponding to the two-finger touch gesture on the display screen 82.

As shown in FIG. 7B, the two-finger touch gesture command is executed, and the corresponding visual feedback is shown on the display screen 82. In a case that the mouse body 10 is moved in the forward direction toward the display screen 82 and the first touch pad 11 and the second touch pad 12 are continuously touched, the two-finger touch gesture icon 823 (e.g. the two-circle icon) is correspondingly moved with the mouse body 10. That is, the two-finger touch gesture icon 823 shown on the display screen 82 is moved in the upward direction.

Figure 7C:
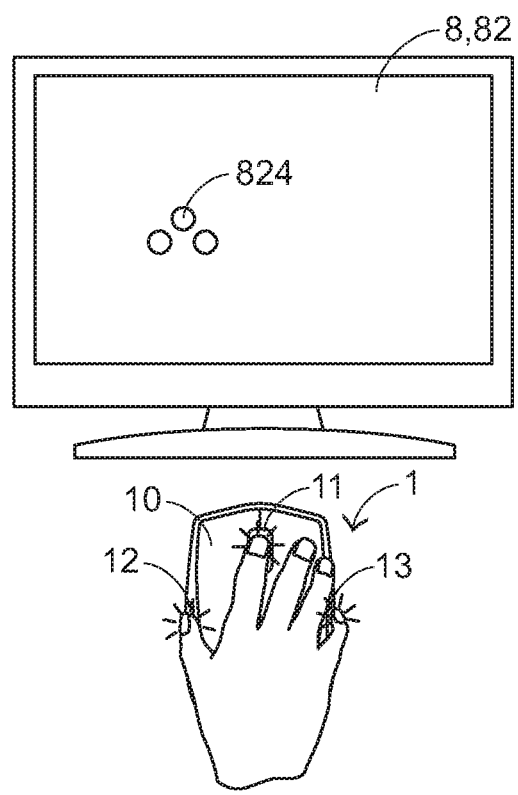
FIGS. 7C~7D schematically illustrate the visual feedback of a computer system by operating the multi-touch mouse according to the first embodiment of the present invention in the three-finger touch gesture control mode.
Figure 7D:
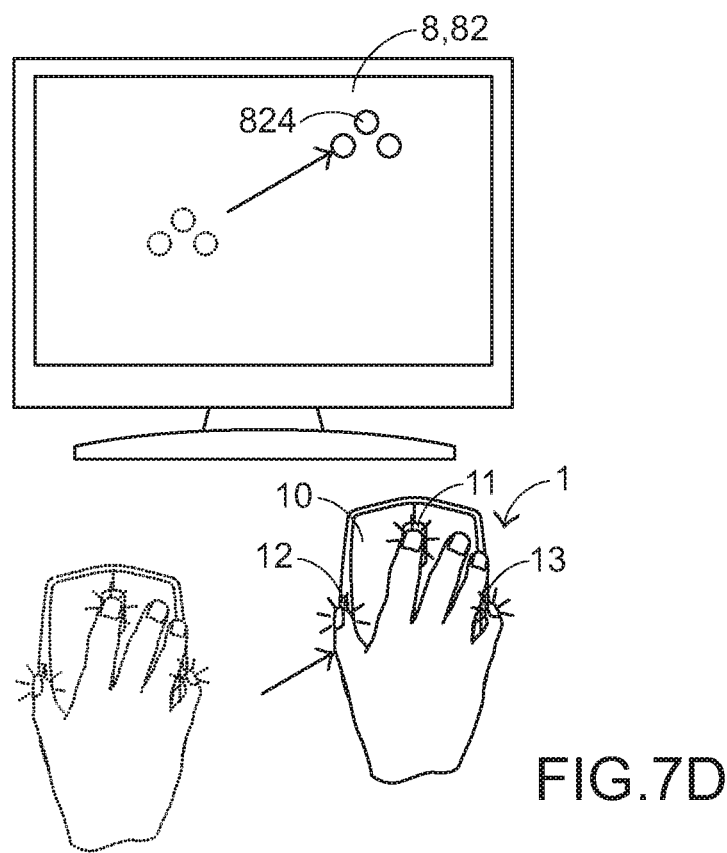

FIGS. 7C-7D schematically illustrate the visual feedback of a computer system by operating the multi-touch mouse according to the first embodiment of the present invention in the three-finger touch gesture control mode. As shown in FIG. 7C, the user touches the first touch pad 11, the second touch pad 12 and the third touch pad 13 of the multi-touch mouse 1 in order to initiate the three-finger touch gesture command. Under this circumstance, the controlling unit 14 detects that the touch states of the first touch pad 11, the second touch pad 12 and the third touch pad 13 are changed from the OFF states to the ON states. As the touch states of the first touch pad 11, the second touch pad 12 and the third touch pad 13 are changed, the control mode of the multi-touch mouse 1 is switched from the conventional two-dimensional mouse mode to the touch gesture control mode. At the same time, the controlling unit 14 issues a switching notification message M to the support program 8111 of the computer system 8. After the switching notification message M corresponding to the touch gesture control mode is received by the support program 8111 of the computer system 8, the support program 8111 is executed to display a three-finger touch gesture icon 824 (e.g. a three-circle icon) corresponding to the three-finger touch gesture on the display screen 82.

As shown in FIG. 7D, the three-finger touch gesture command is executed, and the corresponding visual feedback is shown on the display screen 82. In a case that the mouse body 10 is moved in the top right direction toward the display screen 82 and the first touch pad 11, the second touch pad 12 and the third touch pad 13 are continuously touched, the three-finger touch gesture icon 824 (i.e. the three-circle icon) is correspondingly moved with the mouse body 10. That is, the three-finger touch gesture icon 824 shown on the display screen 82 is moved in the top right direction.

Figure 8A:
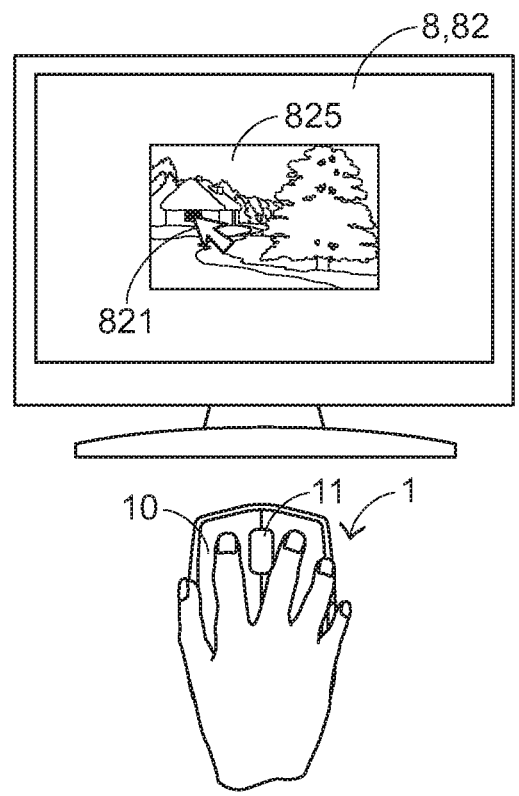
FIGS. 8A~8C schematically illustrate a method of executing a graphic object rotation command of a graphic object manipulation command by operating the multi-touch mouse according to the first embodiment of the present invention in the two-finger touch gesture control mode.
Figure 8B:
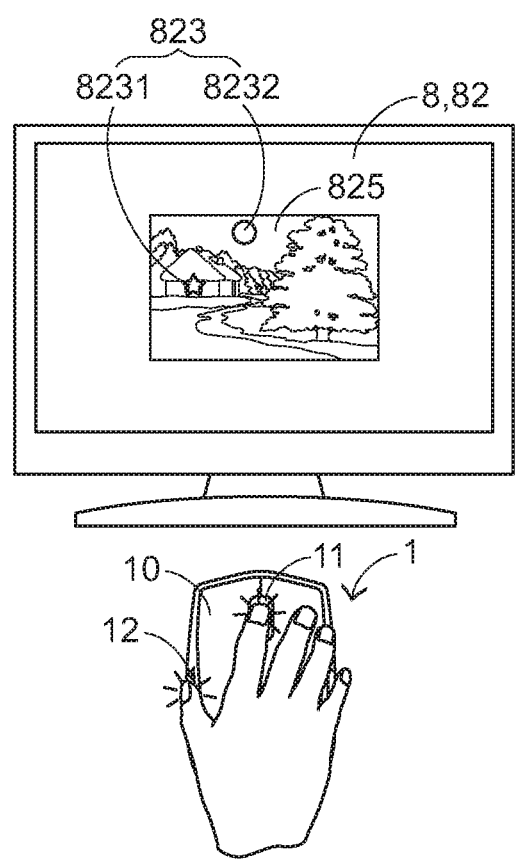
Figure 8C:
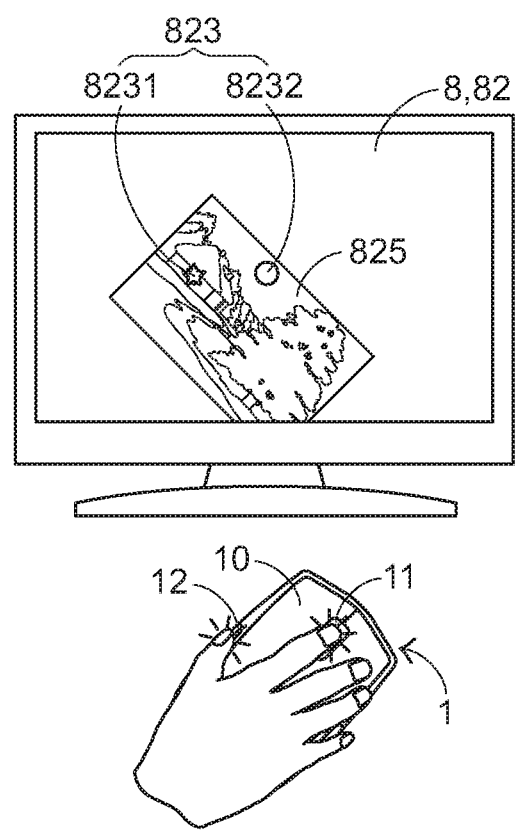

FIGS. 8A~8C schematically illustrate a method of executing a graphic object rotation command of a graphic object manipulation command by operating the multi-touch mouse according to the first embodiment of the present invention in the two-finger touch gesture control mode.

Firstly, as shown in FIG. 8A, the multi-touch mouse 1 is operated in the conventional two-dimensional mouse mode. Consequently, the conventional cursor icon 821 (i.e. the arrow icon) is shown on the display screen 82. For executing a graphic object rotation command of a graphic object manipulation command, the mouse body 10 is firstly moved to locate the cursor icon 821 to a desired position of a target graphic object 825 (e.g. a window of a house). Under this circumstance, the located position of the target graphic object 825 (i.e. the window of the house) is set as a pivot point for the graphic object rotation command.

Then, as shown in FIG. 8B, the first touch pad 11 and the second touch pad 12 are simultaneously touched by the first finger F1 and the second finger F2 of the user, respectively. Under this circumstance, the controlling unit 14 detects that the touch states of the first touch pad 11 and the second touch pad 12 are changed from the OFF states to the ON states. Moreover, before the control mode is switched to the touch gesture control mode, the controlling unit 14 judges whether the time period of maintaining the ON states of the first touch pad 11 and the second touch pad 12 is longer than a predetermined time threshold. If the time period of maintaining the ON states of the first touch pad 11 and the second touch pad 12 is longer than the predetermined time threshold, the controlling unit 14 may recognize that the user's intention is to execute a non-simple multi-finger touch gesture command. At the same time, the initial positions of the two fingers F1 and F2 are recorded. Subsequently, the control mode of the multi-touch mouse 1 is switched to the touch gesture control mode, and the controlling unit 14 generates a graphic object manipulation command (i.e. the non-simple multi-finger touch gesture command). On the other hand, if the time period of maintaining the ON states of the first touch pad 11 and the second touch pad 12 is not longer than the predetermined time threshold, the control mode of the multi-touch mouse 1 is switched to the touch gesture control mode, and the controlling unit 14 generates a simple multi-finger touch gesture command (i.e. the two-finger touch gesture command).

Please refer to FIG. 8B again. After the control mode of the multi-touch mouse 1 is switched to the touch gesture control mode, the controlling unit 14 changes the cursor icon 821 into an emulated two-finger touch gesture icon 823. The emulated two-finger touch gesture icon 823 includes a first finger touch gesture icon 8231 (e.g. a star icon) and a second finger touch gesture icon 8232 (e.g. a circle icon). The first finger touch gesture icon 8231 is located at an original position of the cursor icon 821 (i.e. the located position of the target graphic object 825). The distance between the second finger touch gesture icon 8232 and the first finger touch gesture icon 8231 is pre-defined by the controlling unit 14. Alternatively, in some embodiments, the positions of the star icon and the circle icon are pre-defined by the controlling unit 14, and independent of the original position of the cursor icon.

As shown in FIG. 8C, a graphic object rotation command is executed, and the corresponding visual feedback is shown on the display screen 82. As the user moves the mouse body 10 along a circular trajectory while maintaining the two-finger touch gesture, the second finger touch gesture icon 8232 (i.e. the circle icon) is correspondingly moved by using the first finger touch gesture icon 8231 (i.e. the star icon) as a pivot point. Consequently, the target graphic object 825 is correspondingly rotated relative to the window of the house (i.e. the pivot point).

Figure 9A:
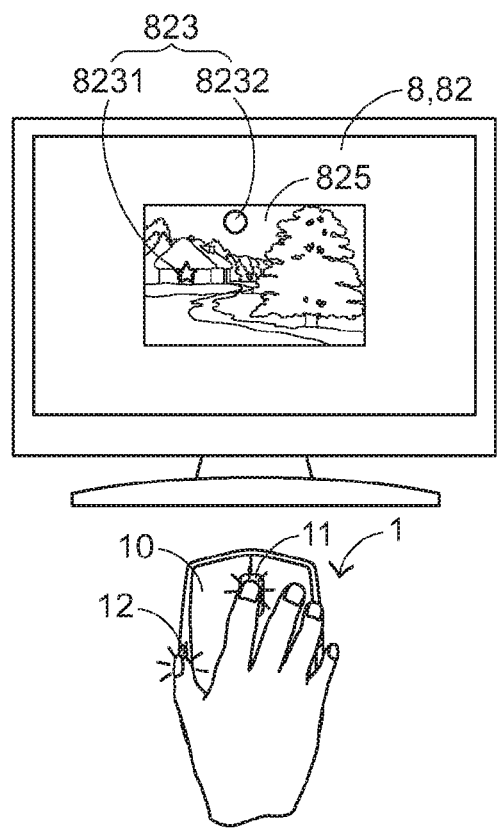
FIGS. 9A and 9B schematically illustrate a method of executing a graphic object zoom command of a graphic object manipulation command by operating the multi-touch mouse according to the first embodiment of the present invention in the two-finger touch gesture control mode.
Figure 9B:
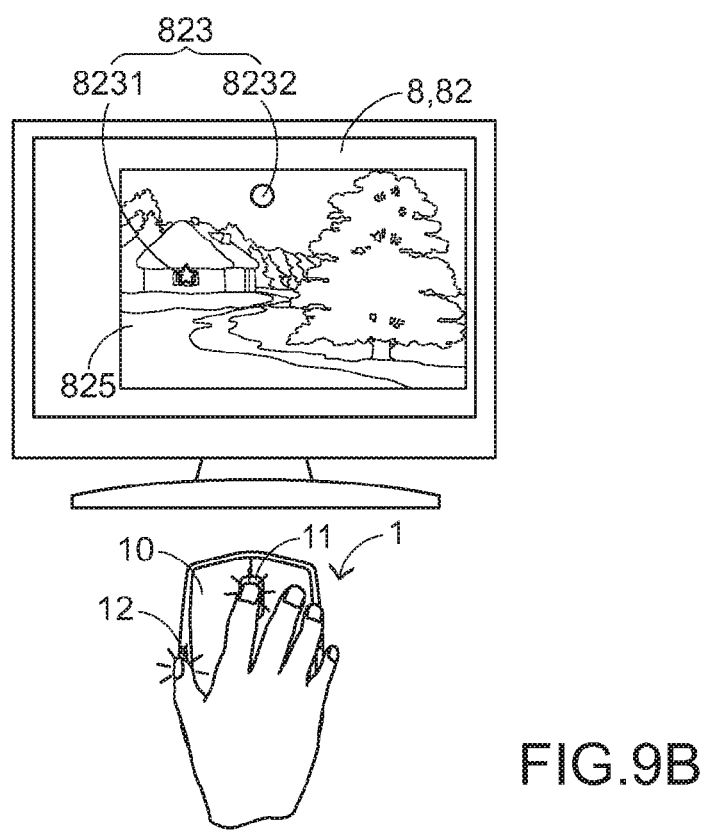

FIGS. 9A and 9B schematically illustrate a method of executing a graphic object zoom command of a graphic object manipulation command by operating the multi-touch mouse according to the first embodiment of the present invention in the two-finger touch gesture control mode.

As shown in FIG. 9A, the first touch pad 11 and the second touch pad 12 are simultaneously touched by the first finger F1 and the second finger F2 of the user, respectively. Under this circumstance, the controlling unit 14 detects that the touch states of the first touch pad 11 and the second touch pad 12 are both in the ON states. Moreover, before the control mode is switched to the touch gesture control mode, the controlling unit 14 judges whether the time period of maintaining the ON states of the first touch pad 11 and the second touch pad 12 is longer than the predetermined time threshold. If the time period of maintaining the ON states of the first touch pad 11 and the second touch pad 12 is longer than the predetermined time threshold, the controlling unit 14 may recognize that the user's intention is to execute a non-simple multi-finger touch gesture command. At the same time, the initial positions of the two fingers F1 and F2 are recorded. Subsequently, the control mode of the multi-touch mouse 1 is switched to the touch gesture control mode, and the controlling unit 14 generates a graphic object manipulation command (i.e. the non-simple multi-finger touch gesture command). On the other hand, if the time period of maintaining the ON states of the first touch pad 11 and the second touch pad 12 is not longer than the predetermined time threshold, the control mode of the multi-touch mouse 1 is switched to the touch gesture control mode, and the controlling unit 14 generates a simple multi-finger touch gesture command (i.e. the two-finger touch gesture command).

As shown in FIG. 9B, a graphic object zoom command is executed, and the corresponding visual feedback is shown on the display screen 82. As the user moves the mouse body 10 in a diagonal direction (e.g. the top right direction) while maintaining the two-finger touch gesture, the second finger touch gesture icon 8232 (i.e. the circle icon) is correspondingly moved by using the first finger touch gesture icon 8231 (i.e. the star icon) as a starting point. Consequently, the graphic object zoom command is executed to correspondingly zoom in the target graphic object 825 relative to the window of the house (i.e. the starting point). On the other hand, as the user moves the mouse body 10 in another diagonal direction (e.g. the bottom left direction) while maintaining the two-finger touch gesture, the second finger touch gesture icon 8232 (i.e. the circle icon) is correspondingly moved by using the first finger touch gesture icon 8231 (i.e. the star icon) as a starting point. Consequently, the graphic object zoom command is executed to correspondingly zoom out the target graphic object 825 relative to the window of the house (i.e. the starting point).

Figure 10A:
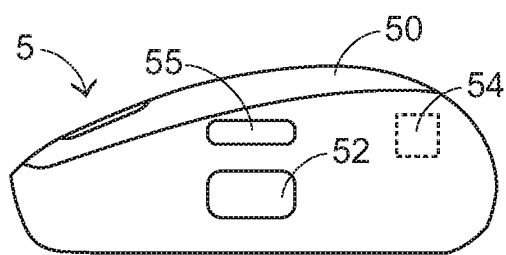
FIG. 10A is a schematic side view illustrating a multi-touch mouse according to a fifth embodiment of the present invention.

FIG. 10A is a schematic side view illustrating a multi-touch mouse according to a fifth embodiment of the present invention. In this embodiment, the multi-touch mouse 5 further comprises a fourth touch pad 55. The fourth touch pad 55 is located at the first side of the of the mouse body 50, and located near the second touch pad 52. The use of the fourth touch pad 55 may generate a non-simple multi-finger touch gesture command. In this context, the term "non-simple multi-finger touch gesture command" indicates a graphic object manipulation command such as a graphic object rotation command or a graphic object zoom command. In a case that the specialized fourth touch pad 55 is touched by the user, the controlling unit 54 detects that the touch state of the fourth touch pad 55 is changed from the OFF state to the ON state. Consequently, the controlling unit 54 is ready to initiate the graphic object rotation command or the graphic object zoom command. As the mouse body 50 is moved while maintaining the ON state of the fourth touch pad 55, the graphic object rotation command or the graphic object zoom command is executed.

Figure 10B:
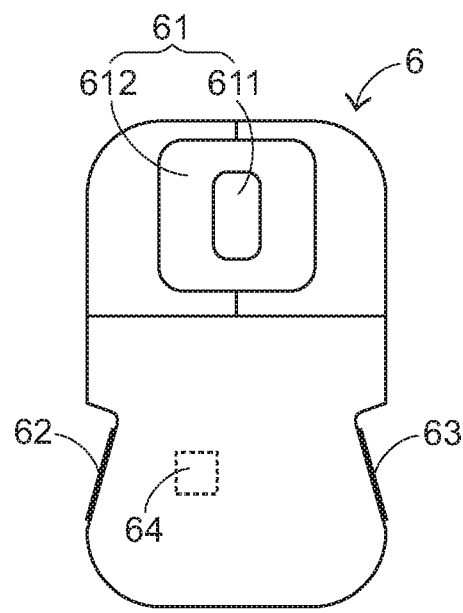
FIG. 10B is a schematic top view illustrating a multi-touch mouse according to a sixth embodiment of the present invention.

FIG. 10B is a schematic top view illustrating a multi-touch mouse according to a sixth embodiment of the present invention. In this embodiment, the first touch pad 61 of the multi-touch mouse 6 is a single-touch touchpad for reporting the two-dimensional position of the fingertip (i.e. the X coordinate and the Y coordinate on the single-touch touchpad). Moreover, the first touch pad 61 comprises two touch regions 611 and 612. The touch region 611 is an inner touch region. The touch region 612 is an outer touch region. The inner touch region 611 is used for generating an emulated one-finger touch gesture command such as a scroll command. The outer touch region 612 is used for generating an emulated multi-finger touch gesture command. In a case that the touch state of the inner touch region 611 of the first touch pad 61 is in the ON state but the touch states of the second touch pad 62 and the third touch pad 63 are both in the OFF states, the inner touch region 611 sends a data packet to the controlling unit 64. After the data packet is received, the controlling unit 64 executes the one-finger touch gesture command.

The operations of the outer touch region 612 will be illustrated as follows. In a case that the touch state of the outer touch region 612 of the first touch pad 61 is in the ON state and the touch states of the second touch pad 62 and the third touch pad 63 are both in the ON states, the outer touch region 612 sends a data packet to the controlling unit 64. After the data packet is received, the controlling unit 64 executes the multi-finger touch gesture command. In a case that the touch state of the outer touch region 612 of the first touch pad 61 is in the ON state but the touch states of the second touch pad 62 and the third touch pad 63 are both in the OFF state, the outer touch region 612 sends a data packet to the controlling unit 64. After the data packet from the outer touch region 612 is received by the controlling unit 64, the data packet is ignored and the multi-finger touch gesture command is not executed by the controlling unit 64. Since outer touch region 612 is used for generating the emulated multi-finger touch gesture command, if the touch states of the second touch pad 62 and the third touch pad 63 are both in the OFF states, the data packet from the outer touch region 612 is ignored is ignored by the controlling unit 64.

In this embodiment, the controlling unit 64 of the multi-touch mouse 6 may be designed to initiate the non-simple multi-finger touch gesture command (i.e. the graphic object manipulation command such as the graphic object rotation command or the graphic object zoom command) in response to a strong touch action (e.g. a tap action) on the first touch pad 61. The force of tapping the first touch pad 61 is larger than the force of touching the first touch pad 61. That is, in a case that the user taps the first touch pad 61 and touches the second touch pad 62 simultaneously, the controlling unit 64 detects that the touch states of the first touch pad 61 and the second touch pad 62 are both in the ON states. Consequently, the controlling unit 64 may judge that the user's intention is to execute the graphic object manipulation command. Under this circumstance, the controlling unit 64 may directly switch the control mode of the multi-touch mouse 6 to the touch gesture control mode without the need of judging whether the time period of maintaining the ON states is longer than the predetermined time threshold. At the same time, the support program 8111 is executed to display the first finger touch gesture icon 8231 (i.e. the star icon) and the second finger touch gesture icon 8232 (i.e. the circle icon) on the display screen 82.

Figure 10C:
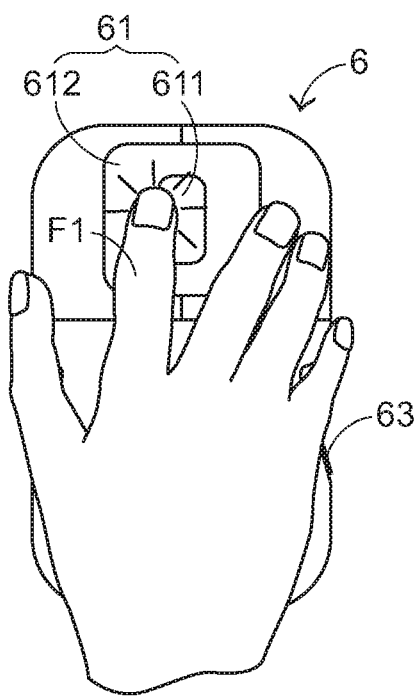
FIG. 10C is a schematic top view illustrating the operations of the multi-touch mouse according to the sixth embodiment of the present invention in the one-finger touch gesture control mode.

FIG. 10C is a schematic top view illustrating the operations of the multi-touch mouse according to the sixth embodiment of the present invention in the one-finger touch gesture control mode. In a case that the inner touch region 611 and the outer touch region 612 of the first touch pad 61 are both touched by the first finger F1 of the user, the controlling unit 64 detects that the touch states of the inner touch region 611 and the outer touch region 612 are both in the ON states. Under this circumstance, the controlling unit 64 generates an emulated multi-finger touch gesture command. In this embodiment, by simultaneously touching the inner touch region 611 and the outer touch region 612 of the first touch pad 61, the multi-finger touch gesture command may be generated without the need of moving the mouse body 60. Under this circumstance, the settings of the controlling unit 64 should be correspondingly defined.

In comparison with the operations of the multi-touch mouse as described in FIG. 10C, the operations of the multi-touch mouse according to the first embodiment of the present invention in the two-finger touch gesture control mode are distinguished (see FIGS. 8A~8C). Firstly, the first touch pad 11 and the second touch pad 12 are simultaneously touched by the first finger F1 and the second finger F2 of the user, respectively. In a case that the time period of maintaining the ON states of the first touch pad 11 and the second touch pad 12 is longer than the predetermined time threshold, the controlling unit 14 may recognize that the user's intention is to execute a graphic object manipulation command. Consequently, the first finger touch gesture icon 8231 (i.e. the star icon) and the second finger touch gesture icon 8232 (i.e. the circle icon) are shown on the display screen 82 (see FIG. 8B). As the user moves the mouse body 10 along a circular trajectory while maintaining the two-finger touch gesture, the controlling unit 14 detects the circular trajectory of moving the mouse body 10 and executes a graphic object rotation command (see FIG. 8C).

Figure 10D:
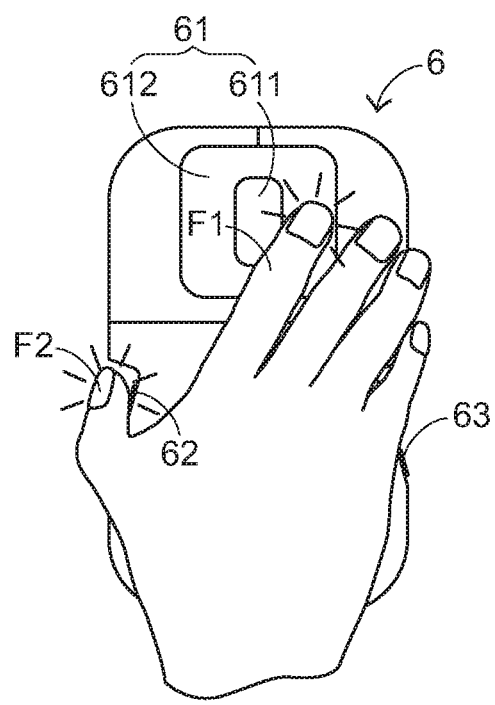
FIG. 10D is a schematic top view illustrating the operations of the multi-touch mouse according to the sixth embodiment of the present invention in the two-finger touch gesture control mode.

The operations of the multi-touch mouse according to the sixth embodiment of the present invention in the two-finger touch gesture control mode will be illustrated as follows. FIG. 10D is a schematic top view illustrating the operations of the multi-touch mouse according to the sixth embodiment of the present invention in the two-finger touch gesture control mode. Firstly, the first touch pad 61 and the second touch pad 62 are simultaneously touched by the first finger F1 and the second finger F2 of the user, respectively, and the first finger F1 is moved on the first touch pad 61. The controlling unit 64 detects that the touch state of the second touch pad 62 is the ON state and touch state of the first touch pad 61 is continuously in the ON states. Under this circumstance, the controlling unit 64 generates an emulated multi-finger touch gesture command.

Figure 10E:
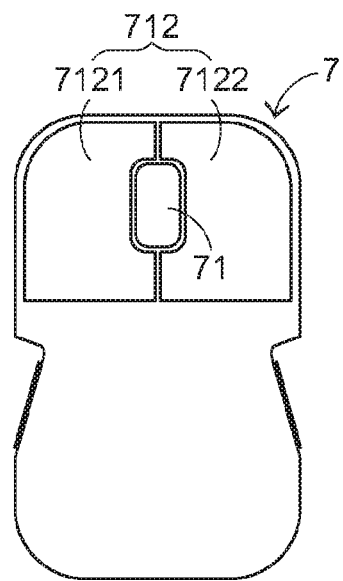
FIG. 10E is a schematic top view illustrating a multi-touch mouse according to a seventh embodiment of the present invention.

FIG. 10E is a schematic top view illustrating a multi-touch mouse according to a seventh embodiment of the present invention. The outward appearance of the multi-touch mouse 7 is substantially identical to that of the multi-touch mouse 6 of FIG. 10B except that the outer touch region 712 of the first touch pad 71 of the multi-touch mouse 7 is divided into a first outer touch part 7121 and a second outer touch part 7122. The first outer touch part 7121 is located at a first side of the inner touch region 711 to be used as a left mouse button. The second outer touch part 7122 is located at a second side of the inner touch region 711 to be used as a right mouse button. Alternatively, in some other embodiments, the second touch pad of the multi-touch mouse 7 is used as a left mouse button, the third touch pad is used as a right mouse button, the first outer touch part is used as the second touch pad, and the second outer touch part is used as the third touch pad.

Alternatively, in some other embodiments, a right boundary of the first outer touch part is extended in the right direction, and a left boundary of the second outer touch part is extended in the left direction. Consequently, the right boundary of the first outer touch part is in contact with the left boundary of the second outer touch part, and the first outer touch part is located beside the second outer touch part. This configuration provides seamless continuation of the one-finger touch gesture on the first outer touch part and the second outer touch part. Consequently, a data packet is continuously sent to the controlling unit. Under this circumstance, the settings of the controlling unit should be correspondingly defined, and the settings are similar to those of the controlling unit of FIG. 10B.

Figure 11:
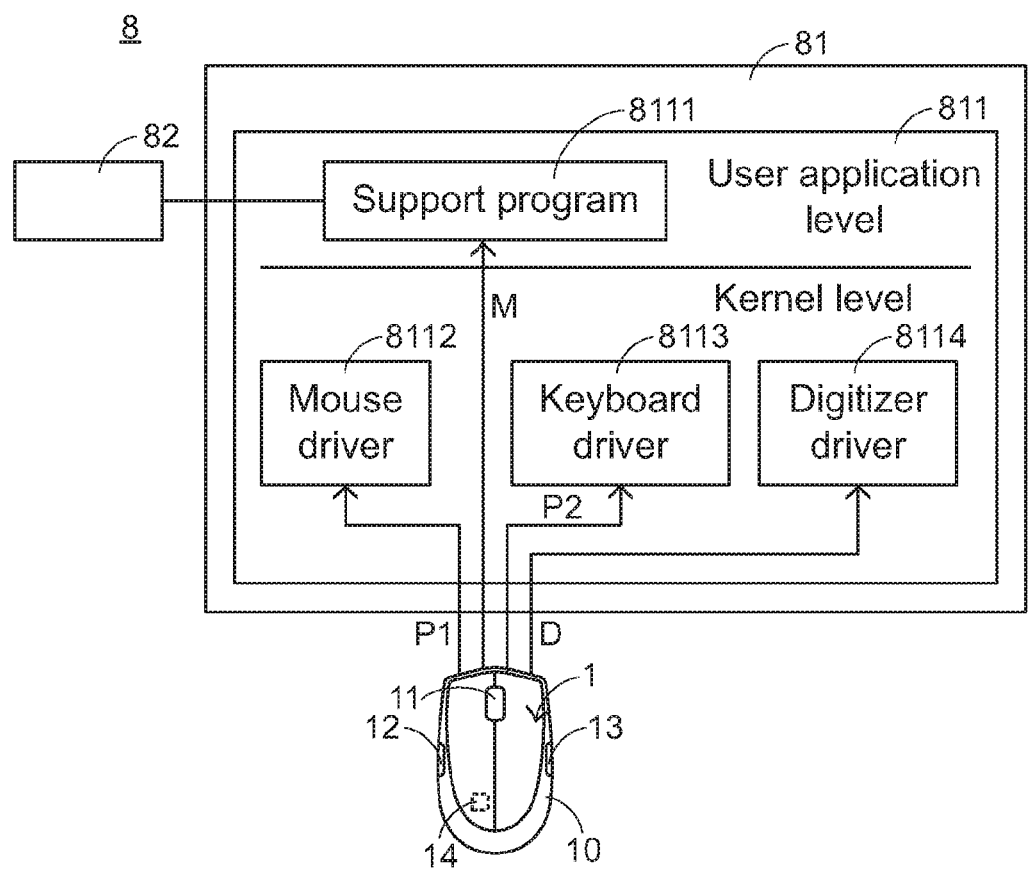
FIG. 11 is a schematic functional block diagram illustrating the connection between the multi-touch mouse according to the first embodiment of the present invention and a computer system.

2. The Controlling Unit Structure and Interface of Device Driver Program on Computer Host FIG. 11 is a schematic functional block diagram illustrating the connection between the multi-touch mouse according to the first embodiment of the present invention and a computer system. In FIG. 11, the multi-touch mouse 1 and the computer system 8 are shown. The computer system 8 comprises a computer host 81 and a display screen 82. An operating system 811 is installed in the computer host 81. The operating system 811 comprises a support program 8111, a mouse driver 8112, a keyboard driver 8113, and a digitizer driver 8114. The support program 8111 is in a user application level of the operating system 811. The mouse driver 8112, the keyboard driver 8113, and the digitizer driver 8114 are in a kernel level of the operating system 811. The settings of the controlling unit 14 may be defined to have the functions of: (1) sending the data packet P1 of the emulated mouse and the data packet P2 of the emulated keyboard to the computer host 81, and (2) sending a raw data D of the emulated multi-touch digitizer to the computer host 81. The support program 8111 will receive the emulated touch gesture command from the controlling unit 14, and allow the corresponding touch gesture icons 822, 823 and 824 to be shown on the display screen 82 of the computer system 8.

Figure 12:
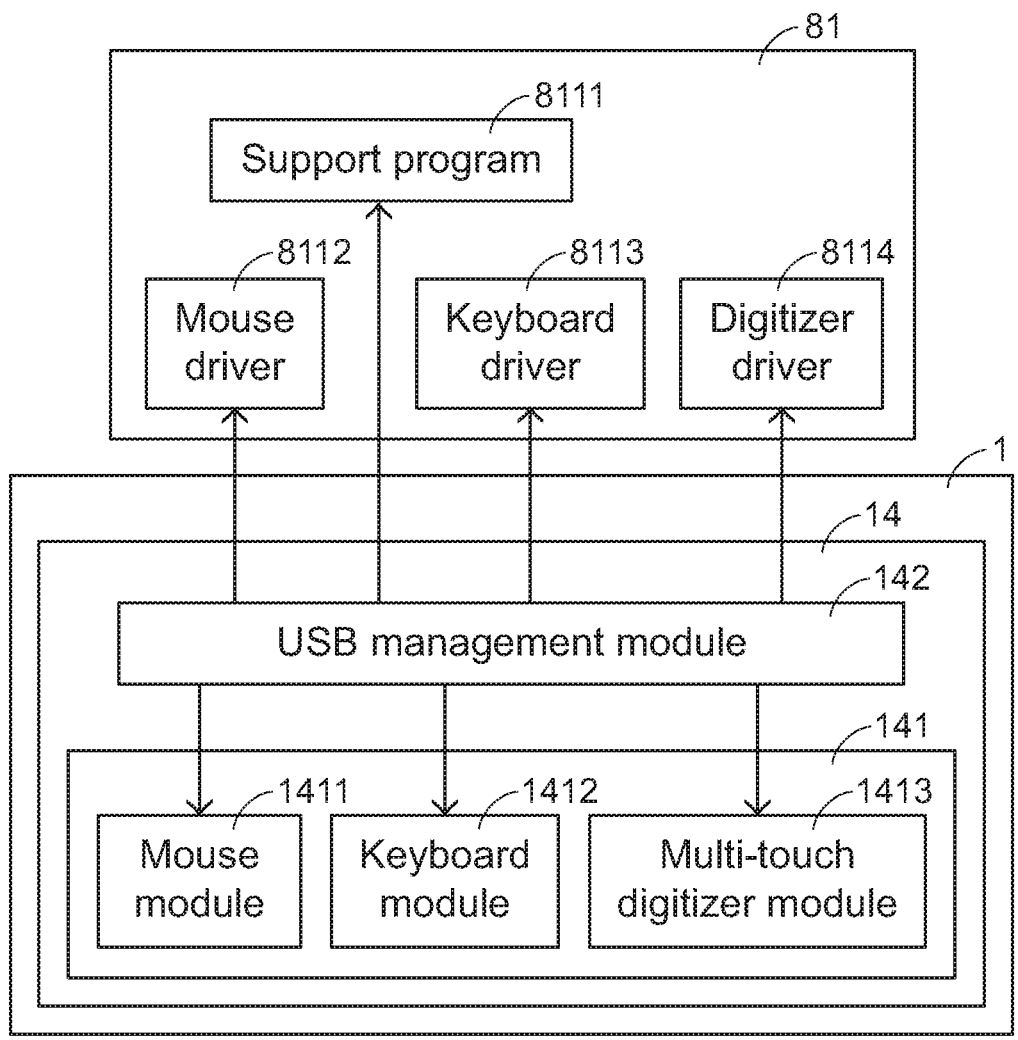
FIG. 12 is a schematic functional block diagram illustrating the connection between the controlling unit of the multi-touch mouse according to the first embodiment of the present invention and a computer system.

FIG. 12 is a schematic functional block diagram illustrating the connection between the controlling unit of the multi-touch mouse according to the first embodiment of the present invention and a computer system. As shown in FIG. 12, the controlling unit 14 comprises plural logic device modules 141 and a USB management module 142. The plural logic device modules 141 comprise a mouse module 1411, a keyboard module 1412, and a multi-touch digitizer module 1413. The mouse module 1411, the keyboard module 1412 and the multi-touch digitizer module 1413 are connected with the USB management module 142. In addition, the mouse module 1411, the keyboard module 1412 and the multi-touch digitizer module 1413 are connected with the computer system 8 through the USB management module 142. The USB management module 142 is used for sending a corresponding data packet to the computer system 8. For example, by the USB management module 142, a mouse data packet may be sent to the mouse driver 8112 of the computer system 8, a keyboard data packet may be sent to the keyboard driver 8113 of the computer system 8, or a digitizer data packet (i.e. the emulated touch gesture command) may be sent to the digitizer driver 8114 of the computer system 8.

Figure 13:
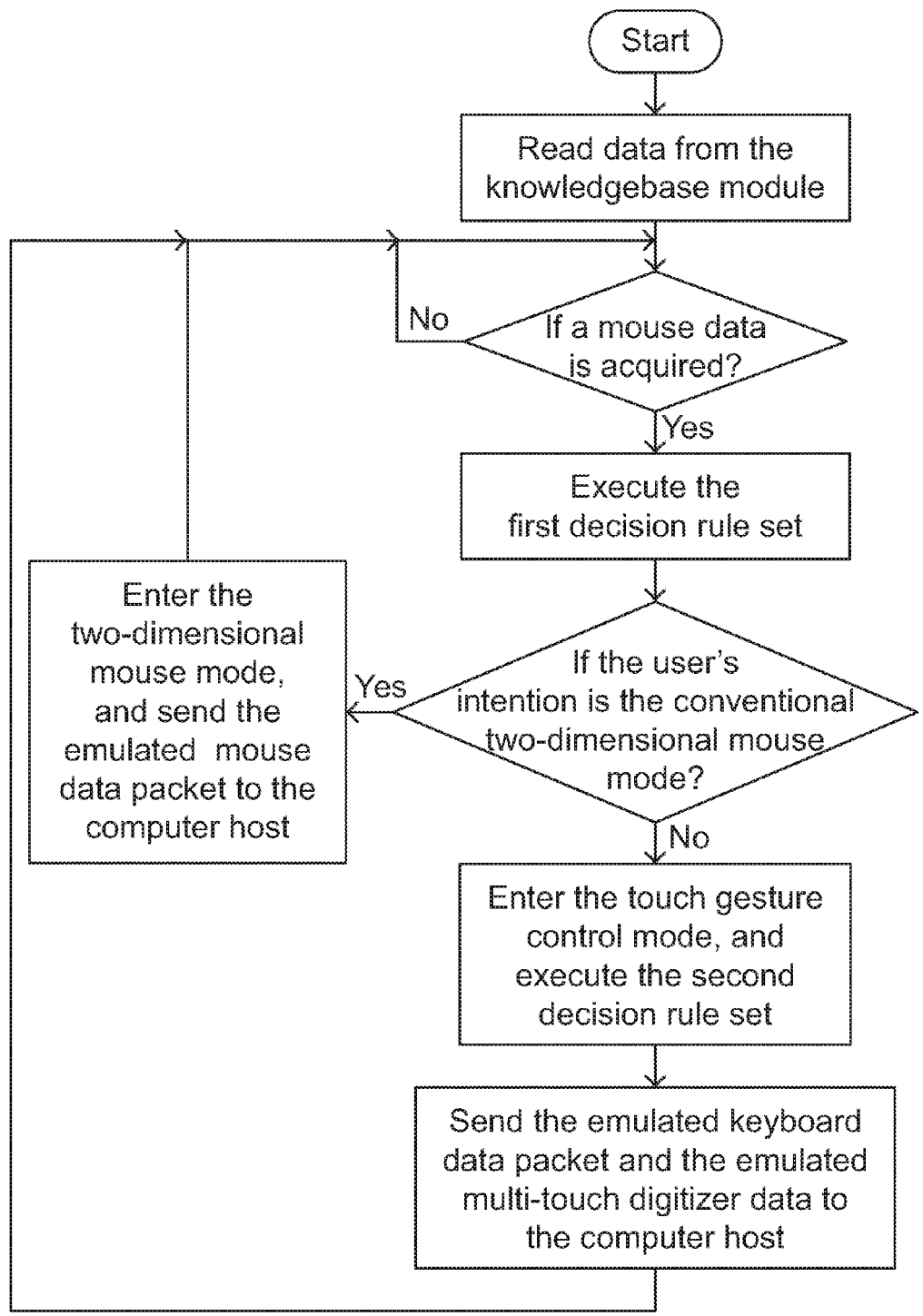
FIG. 13 is a flowchart illustrating a method of generating a multi-finger touch gesture command by the controlling unit of the multi-touch mouse according to the first embodiment of the present invention.

FIG. 13 is a flowchart illustrating a method of generating a multi-finger touch gesture command by the controlling unit of the multi-touch mouse according to the first embodiment of the present invention. The controlling unit 14 adopts a primitive expert system structure to identify the user's intention in order to select a mouse control command. Two decision rule sets play important roles to correctly infer the user's intention at every time tick. According to the mouse control command based on the output of the decision rules of the expert system structure, two-dimensional mouse data packets or emulated touch gesture commands corresponding to the mouse control mode are sent from the controlling unit 14 to the computer host 81.

It is noted that the expert system consists of an inference engine module and a knowledgebase module to make an intelligent decision by inferring the control mode of the multi-mode mouse among plural mouse control modes according to the user's intention. For example, the plural mouse control modes include a conventional two-dimensional mouse, a one-finger touch gesture mode, a two-finger touch gesture mode, and so on. The inference engine is expressed by the set of IF-THEN rules in order to construct a "decision tree". The knowledgebase module comprises plural pre-defined data that are obtained from the experience of human expert. In other words, the expert system utilizes the inference engine module and the knowledgebase module to infer the mouse control mode that complies with the user's intention.

The two decision rule sets will be illustrated as follows. For illustration, the decision rules are used to identify the intention of the right-handed user who is more able with the right hand.

The first decision rule set is summarized as follows:

(1) The ON state of the first touch pad is used to fire the decision rule of touch gesture activation. Under this circumstance, the control mode of the multi-control mouse is switched to the touch gesture control mode.

(2) The ON state of the first touch pad, the ON state of the third touch pad and the OFF state of the second touch pad are ignored as an undefined touch pattern even if user's fingers are placed thereon. Under this circumstance, the control mode of the multi-control mouse is switched to the conventional two-dimensional mouse mode.

(3) The OFF state of the first touch pad, the ON state of the third touch pad and the ON state of the second touch pad are ignored as an undefined touch pattern even if user's fingers are placed thereon. Under this circumstance, the control mode of the multi-control mouse is switched to the conventional two-dimensional mouse mode.

(4) After the ON state of the first touch pad is detected and before the touch gesture control mode is activated, a first predetermined time threshold is applied. If the time period of maintaining the ON state of the first touch pad is longer than the first predetermined time threshold, the control mode of the multi-control mouse is set as the touch gesture control mode.

(5) After the ON states of plural touch pads are detected and before the touch gesture control mode is activated, a second predetermined time threshold is applied. If the time periods of maintaining the ON states of these touch pads are longer than the second predetermined time threshold, the control mode of the multi-control mouse is set as the touch gesture control mode.

It is noted that the tracking sensitivity of the multi-touch mouse may be adjusted according to the control mode of the multi-touch mouse. For example, if the control mode of the multi-touch mouse is switched from the conventional two-dimensional mouse mode to the touch gesture control mode, the tracking sensitivity of the optical sensor of the multi-touch mouse is set as the second default tracking sensitivity value. On the other hand, if the control mode of the multi-touch mouse is switched from the touch gesture control mode to the conventional two-dimensional mouse mode, the tracking sensitivity of the optical sensor of the multi-touch mouse is set as the first default tracking sensitivity value. The second default tracking sensitivity value is larger than the first default tracking sensitivity value. For example, as mentioned above, the first default tracking sensitivity value is 800 CPI, and the second default tracking sensitivity value is 3000 CPI.

The second decision rule set is summarized below.

(1) After the ON state of the first touch pad is detected, if the time period of maintaining the ON state of the first touch pad is not longer than the first predetermined time threshold, the control mode of the multi-control mouse is immediately switched from the touch gesture control mode to the conventional two-dimensional mouse mode.

(2) After the ON states of the first touch pad and the second touch pad are detected, if the time periods of maintaining the ON states of the first touch pad and the second touch pad are both longer than the second predetermined time threshold, a two-finger touch gesture command is generated.

(3) After the ON states of the first touch pad, the second touch pad and the third touch pad are detected, if the time periods of maintaining the ON states of the first touch pad, the second touch pad and the third touch pad are all longer than a third predetermined time threshold, a three-finger touch gesture command is generated.

(4) If the touch state of the first touch pad is changed from the ON state to the OFF state but the touch states of the second touch pad and the third touch pad are the ON states, the control mode of the multi-control mouse is immediately switched from the touch gesture control mode to the conventional two-dimensional mouse mode.

(5) After the touch states of the first touch pad and the second touch pad are changed to the ON states but the touch state of the third touch pad is changed from the ON state to the OFF state, if the time period of maintaining this condition is longer than a fourth predetermined time threshold, a two-finger touch gesture command is generated.

(6) After the touch states of the first touch pad and the third touch pad are changed to the ON states but the touch state of the second touch pad is changed from the ON state to the OFF state, if the time period of maintaining this condition is longer than a fifth predetermined time threshold, the control mode of the multi-control mouse is immediately switched from the touch gesture control mode to the conventional two-dimensional mouse mode. On the other hand, if the time period of maintaining this condition is not longer than the fifth predetermined time threshold, the control mode of the multi-control mouse is maintained in the touch gesture control mode.

(7) After the touch state of the first touch pad is changed to the ON state but the touch states of the second touch pad and the third touch pad are changed from the ON states to the OFF states, if the time period of maintaining this condition is longer than a sixth predetermined time threshold, the control mode of the multi-control mouse is immediately switched from the three-finger touch gesture control mode to the one-finger touch gesture control mode. On the other hand, if the time period of maintaining this condition is not longer than the sixth predetermined time threshold, the control mode of the multi-control mouse is maintained in the three-finger touch gesture control mode.

Figure 14:
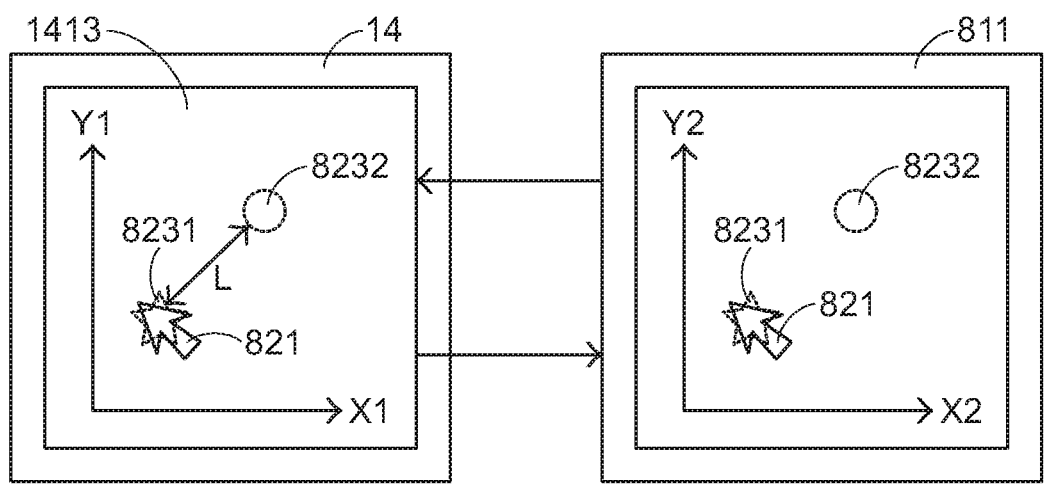
FIG. 14 schematically illustrates the mapping of a two-finger touch points from the controlling unit of the multi-touch mouse according to the first embodiment of the present invention to the display screen.

3. Mapping of Multi-Touch Point Data from the Controlling Unit to the Display Screen Coordinates at Manipulation of Graphic Object FIG. 14 schematically illustrates the mapping of a two-finger touch points from the controlling unit of the multi-touch mouse according to the first embodiment of the present invention to the display screen. As shown in FIG. 14, the emulated finger touch positions (i.e. the first finger touch gesture icon 8231 and the second finger touch gesture icon 8232) are mapped from the coordinate system X1-Y1 of the controlling unit 14 to the X2-Y2 coordinate system of the display screen 82. The multi-touch digitizer module 1413 of the controlling unit 14 defines a maximum size of the virtual multi-touch digitizer as 10,000×8,000 pixel size according to the specifications of USB organization in the US.

The basic steps of the mapping procedures will be illustrated as follows.

Step 1: The position of the cursor icon 821 shown on the X2-Y2 coordinate system of the display screen 82 is received by the controlling unit 14, and the position of the cursor icon 821 shown on the X2-Y2 coordinate system of the display screen 82 is converted to a corresponding position of the coordinate system X1-Y1 of the virtual multi-touch digitizer.

Step 2: The multi-touch digitizer module 1413 computes the position of the cursor icon 821 on the coordinate system X1-Y1 of the virtual multi-touch digitizer. The position of the cursor icon 821 corresponds to the positions of the first finger touch gesture icon 8231 and the second finger touch gesture icon 8232, wherein the distance between the first finger touch gesture icon 8231 and the second finger touch gesture icon 8232 is equal to a pre-defined distance L. Then, the positions of the first finger touch gesture icon 8231 and the second finger touch gesture icon 8232 on the coordinate system X1-Y1 of the virtual multi-touch digitizer are sent from the controlling unit 14 to the digitizer driver 8114 and the support program 8111 of the computer system 8. The operating system 811 (e.g. Windows 8) of the computer system 8 automatically generates a conversion signal. In response to the conversion signal, the position of the cursor icon 821 on the coordinate system X1-Y1 of the virtual multi-touch digitizer may be converted into the corresponding position on the X2-Y2 coordinate system of the display screen 82. After the conversion signal is received by the support program 8111, the first finger touch gesture icon 8231 is shown on the display screen 82. That is, the first finger touch gesture icon 8231 is shown at the position of the cursor icon 821, and the second finger touch gesture icon 8232 is also shown (see FIG. 14).

Step S3: If the mouse body 10 is moved, the mouse position change data including the delta X coordinate data and the delta Y coordinate data are added to the position of the emulated second finger touch gesture icon 8232 on the coordinate system X1-Y1 of the virtual multi-touch digitizer.

Step S4: The updated mouse position change data of the emulated second finger touch gesture icon 8232 on the coordinate system X1-Y1 of the virtual multi-touch digitizer are sent to the plural drivers 8112~8114 and the support program 8111 of the computer system 8.

Step S5: After the updated mouse position change data of the emulated second finger touch gesture icon 8232 are received by the plural drivers 8112~8114, the position of the second finger touch gesture icon 8232 on the X2-Y2 coordinate system of the display screen 82 is updated by the computer system 8.

Step S6: After the updated mouse position change data of the emulated second finger touch gesture icon 8232 are received by the support program 8111, the updated position of the second finger touch gesture icon 8232 is shown on the display screen 82.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-touch mouse in communication with a computer system, said multi-touch mouse comprising:

a mouse body;

a first touch pad disposed on a top surface of said mouse body, wherein a touch state of said first touch pad is changed to an ON state when said first touch pad is touched, wherein if said first touch pad is in said ON state, a control mode of said multi-touch mouse is switched from a conventional two-dimensional mouse mode to a touch gesture control mode;

an optical sensor disposed within said mouse body for tracking a motion of said mouse body; and a controlling unit connected with said first touch pad and said optical sensor for detecting said touch state of said first touch pad and receiving a result of tracking said motion of said mouse body, wherein if said first touch pad is in said ON state and said result of tracking said motion of said mouse body is received by said controlling unit, said controlling unit switches said control mode of said multi-touch mouse to said touch gesture control mode and issues a one-finger touch gesture command to said computer system, so that said computer system executes a one-finger touch gesture function corresponding to said one-finger touch gesture command, wherein if said control mode of said multi-touch mouse is in said conventional two-dimensional mouse mode, a tracking sensitivity of said optical sensor has a first default tracking sensitivity value, wherein if said control mode of said multi-touch is switched from said conventional two-dimensional mouse mode to said touch gesture control mode, said tracking sensitivity of said optical sensor is changed from said first default tracking sensitivity value to second default tracking sensitivity value, wherein said second default tracking sensitivity value is larger than said first default tracking sensitivity value.

2. The multi-touch mouse according to claim 1, wherein said computer system comprises:
- a computer host in communication with said multi-touch mouse for receiving said one-finger touch gesture command from said multi-touch mouse, thereby executing said one-finger touch gesture function; and
- a display screen connected with said computer host, wherein if said multi-touch mouse is in said conventional two-dimensional mouse mode, a cursor icon is shown on said display screen, wherein if said multi-touch mouse is in said touch gesture control mode, a one-finger touch gesture icon is shown on said display screen.

3. The multi-touch mouse according to claim 1, wherein said first touch pad is a four-way directional digital switch or a digital toggle switch.

4. The multi-touch mouse according to claim 1, wherein said first touch pad comprises:
- a middle touch region, wherein a touch state of said middle touch region is changed to said ON state when said middle touch region is touched;
- a top touch region located at a top side of said middle touch region, wherein a touch state of said top touch region is changed to said ON state when said top touch region is touched;
- a left touch region located at a left side of said middle touch region, wherein a touch state of said left touch region is changed to said ON state when said left touch region is touched;
- a bottom touch region located at a bottom side of said middle touch region, wherein a touch state of said bottom touch region is changed to said ON state when said bottom touch region is touched; and
- a right touch region located at a right side of said middle touch region, wherein a touch state of said right touch region is changed to said ON state when said right touch region is touched.

5. The multi-touch mouse according to claim 1, further comprising:
- a second touch pad located at a first side of said mouse body, wherein a touch state of said second touch pad is changed to said ON state when said second touch pad is touched; and
- a third touch pad located at a second side of said mouse body, wherein a touch state of said third touch pad is changed to said ON state when said third touch pad is touched,
- wherein if said first touch pad and said second touch pad are both in said ON states and said result of tracking said motion of said mouse body is received by said controlling unit, said controlling unit switches said control mode of said multi-touch mouse to said touch gesture control mode and issues a two-finger touch gesture command to said computer system, so that said computer system executes a two-finger touch gesture function corresponding to said two-finger touch gesture command,
- wherein if said first touch pad, said second touch pad and said third touch pad are all in said ON states and said result of tracking said motion of said mouse body is received by said controlling unit, said controlling unit switches said control mode of said multi-touch mouse to said touch gesture control mode and issues a three-finger touch gesture command to said computer system, so that said computer system executes a three-finger touch gesture function corresponding to said three-finger touch gesture command.

6. The multi-touch mouse according to claim 5, wherein said computer system comprises:
- a computer host in communication with said multi-touch mouse for receiving said two-finger touch gesture command or said three-finger touch gesture command from said multi-touch mouse, thereby executing said two-finger touch gesture function or said three-finger touch gesture command; and
- a display screen connected with said computer host, wherein if said multi-touch mouse is in said conventional two-dimensional mouse mode, a cursor icon is shown on said display screen, wherein if said multi-touch mouse is in said touch gesture control mode, a two-finger touch gesture icon or a three-finger touch gesture icon is shown on said display screen.

7. The multi-touch mouse according to claim 5, wherein said first touch pad comprises:
- an inner touch region, wherein a touch state of said inner touch region is changed to said ON state when said inner touch region is touched, wherein if said inner touch region is in said ON state, said controlling unit switches said control mode of said multi-touch mouse to said touch gesture control mode and issues said one-finger touch gesture command to said computer system; and
- an outer touch region disposed around said inner touch region, wherein a touch state of said outer touch region is changed to said ON state when said outer touch region is touched, wherein if said outer touch region and said second touch pad or said third touch pad are both in said ON states, said controlling unit switches said control mode of said multi-touch mouse to said touch gesture control mode and issues said two-finger touch gesture command to said computer system, wherein if said outer touch region, said second touch pad and said third touch pad are all in said ON states, said controlling unit switches said control mode of said multi-touch mouse to said touch gesture control mode and issues said three-finger touch gesture command to said computer system.

8. The multi-touch mouse according to claim 5, wherein after said first touch pad and said second touch pad or said third touch pad are both touched to be in said ON states, said controlling unit judges whether a time period of maintaining said ON states of said first touch pad and said second touch pad or said third touch pad is longer than a predetermined time threshold or not, wherein if said time period of maintaining said ON states of said first touch pad and said second touch pad or said third touch pad is longer than said predetermined time threshold, said controlling unit switches said control mode of said multi-touch mouse to said touch gesture control mode and generates a graphic object manipulation command, wherein if said time period of maintaining said ON states of said first touch pad and said second touch pad or said third touch pad is not longer than said predetermined time threshold, said controlling unit switches said control mode of said multi-touch mouse to said touch gesture control mode and generates said two-finger touch gesture command.

9. The multi-touch mouse according to claim 8, wherein after said graphic object manipulation command is received by a computer host of said computer system, a cursor icon shown on a display screen of said computer system is converted into a first finger touch gesture icon and a second finger touch gesture icon by said computer host, and a graphic object manipulation function corresponding to said graphic object manipulation command is executed by said computer host.

10. The multi-touch mouse according to claim 5, wherein in response to a tap action on said first touch pad and a touch action on said second touch pad or said third touch pad, said touch states of said first touch pad and second touch pad or said third touch pad are changed to said ON states, and said controlling unit switches said control mode of said multi-touch mouse to said touch gesture control mode and generates a graphic object manipulation command, wherein a force of applying said tap action on said first touch pad is larger than a force of applying said touch action on said second touch pad or said third touch pad.

11. The multi-touch mouse according to claim 10, wherein after said graphic object manipulation command is received by a computer host of said computer system, a cursor icon shown on a display screen of said computer system is converted into a first finger touch gesture icon and a second finger touch gesture icon by said computer host, and a graphic object manipulation function corresponding to said graphic object manipulation command is executed by said computer host.

12. The multi-touch mouse according to claim 5, further comprising a fourth touch pad, which is located at said first side of said mouse body and located near said second touch pad, wherein a touch state of said fourth touch pad is changed to said ON state when said fourth touch pad is touched, wherein if said fourth touch pad is in said ON state, said controlling unit switches said control mode of said multi-touch mouse to said touch gesture control mode and generates a graphic object manipulation command.

13. The multi-touch mouse according to claim 12, wherein after said graphic object manipulation command is received by a computer host of said computer system, a cursor icon shown on a display screen of said computer system is converted into a first finger touch gesture icon and a second finger touch gesture icon by said computer host, and a graphic object manipulation function corresponding to said graphic object manipulation command is executed by said computer host.

14. The multi-touch mouse according to claim 1, wherein after said control mode of said multi-touch mouse is in said touch gesture control mode, if a time period of maintaining said ON state of said first touch region is not longer than a predetermined time threshold, said controlling unit switches said control mode of said multi-touch mouse to said conventional two-dimensional mouse mode.

15. A multi-touch mouse in communication with a computer system, said multi-touch mouse comprising:
    a mouse body;
    a first touch pad disposed on a top surface of said mouse body, and comprising:
        an inner touch region, wherein an touch state of said inner touch region is changed to an ON state when said inner touch region is touched, wherein if said inner touch region is in said ON state, a control mode of said multi-touch mouse is switched from a conventional two-dimensional mouse mode to a touch gesture control mode; and
        an outer touch region located near said inner touch region, wherein a touch state of said outer touch region is changed to said ON state when said outer touch region is touched; and
    a controlling unit connected with said first touch pad for detecting said touch states of said inner touch region and said outer touch region, wherein if said inner touch region and said outer touch region are both in said ON states, said controlling unit switches said control mode of said multi-touch mouse to said touch gesture control mode and issues a two-finger touch gesture command to said computer system, so that said computer system executes a two-finger touch gesture function corresponding to said two-finger touch gesture command, wherein if said control mode of said multi-touch mouse is in said conventional two-dimensional mouse mode, a tracking sensitivity of said optical sensor has a first default tracking sensitivity value, wherein if said control mode of said multi-touch mouse is switched from said conventional two-dimensional mouse mode to said touch gesture control mode, said tracking sensitivity of said optical sensor is changed from said first default tracking sensitivity value to a second default tracking sensitivity value, wherein said second default tracking sensitivity value is larger than said first default tracking sensitivity value.

16. The multi-touch mouse according to claim 15, wherein said computer system comprises:
    a computer host in communication with said multi-touch mouse for receiving said two-finger touch gesture command from said multi-touch mouse, thereby executing said two-finger touch gesture function; and
    a display screen connected with said computer host, wherein if said multi-touch mouse is in said conventional two-dimensional mouse mode, a cursor icon is shown on said display screen, wherein if said multi-touch mouse is in said touch gesture control mode, a two-finger touch gesture icon is shown on said display screen.

17. The multi-touch mouse according to claim 15, further comprising a second touch pad, which is located at a first side of said mouse body, wherein a touch state of said second touch pad is changed to said ON state when said second touch pad is touched, wherein if said second touch pad is in said ON state and said first touch pad is continuously in said ON state, said controlling unit switches said control mode of said multi-touch mouse to said touch gesture control mode and issues a graphic object manipulation command to said computer system, so that said computer system executes a graphic object manipulation function corresponding to said graphic object manipulation command.

18. The multi-touch mouse according to claim 17, wherein after said graphic object manipulation command is received by a computer host of said computer system, a cursor icon shown on a display screen of said computer system is converted into a first finger touch gesture icon and a second finger touch gesture icon by said computer host, and said graphic object manipulation function corresponding to said graphic object manipulation command is executed by said computer host.

19. The multi-touch mouse according to claim 15, further comprising:
    a second touch pad located at a first side of said mouse body, wherein a touch state of said second touch pad is changed to said ON state when said second touch pad is touched; and
    a fourth touch pad located at said first side of said mouse body and located near said second touch pad, wherein a touch state of said fourth touch pad is changed to said ON state when said fourth touch pad is touched, wherein if said fourth touch pad is in said ON state, said controlling unit switches said control mode of said multi-touch mouse to said touch gesture control mode and generates a graphic object manipulation command.

20. The multi-touch mouse according to claim 19, wherein after said graphic object manipulation command is received by a computer host of said computer system, a cursor icon shown on a display screen of said computer system is converted into a first finger touch gesture icon and a second finger touch gesture icon by said computer host, and a graphic object manipulation function corresponding to said graphic object manipulation command is executed by said computer host.

21. The multi-touch mouse according to claim 15, wherein said outer touch region comprises:
- a first outer touch part located at a first side of said inner touch region, wherein a touch state of said first outer touch part is changed to said ON state when said first outer touch part is touched, wherein if said first outer touch part is in said ON state, said controlling unit issues a first button command to said computer system, so that said computer system executes a first button function corresponding to said first button command; and
- a second outer touch part located at a second side of said inner touch region, wherein a touch state of said second outer touch part is changed to said ON state when said second outer touch part is touched, wherein if said second outer touch part is in said ON state, said controlling unit issues a second button command to said computer system, so that said computer system executes a second button function corresponding to said second button command.

22. The multi-touch mouse according to claim 15, wherein after said control mode of said multi-touch mouse is in said touch gesture control mode, if a time period of maintaining said ON state of said inner touch region is not longer than a predetermined time threshold, said controlling unit switches said control mode of said multi-touch mouse to said conventional two-dimensional mouse mode.

* * * * *